(12) United States Patent
Mizuno

(10) Patent No.: US 11,716,437 B2
(45) Date of Patent: Aug. 1, 2023

(54) CONVERTING TEXTURE INFORMATION OF OBJECT INTO INK AMOUNT INFORMATION, USING VALUES OF AN MTF AS INTERNAL SCATTERING AND COLOR SIGNAL INFORMATION, TO REPRODUCE THE OBJECT AND ITS TEXTURE ON A MEDIUM

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/824,201

(22) Filed: May 25, 2022

(65) Prior Publication Data

US 2022/0286582 A1    Sep. 8, 2022

Related U.S. Application Data

(63) Continuation of application No. PCT/JP2020/044283, filed on Nov. 27, 2020.

(30) Foreign Application Priority Data

Nov. 27, 2019   (JP) .............................. JP2019-214577

(51) Int. Cl.
*H04N 1/60*   (2006.01)
*H04N 1/00*   (2006.01)

(52) U.S. Cl.
CPC ......... *H04N 1/6072* (2013.01); *H04N 1/0009* (2013.01); *H04N 1/00015* (2013.01);
(Continued)

(58) Field of Classification Search
None
See application file for complete search history.

(56) References Cited

U.S. PATENT DOCUMENTS 9,103,717 B2 *   8/2015   Oba ....................... G01N 21/55
9,628,670 B2 *   4/2017   Fukamachi .......... H04N 1/6097
(Continued)

FOREIGN PATENT DOCUMENTS

JP   2000-241293 A   9/2000
JP   2016-144005 A   8/2016
(Continued)

OTHER PUBLICATIONS

International Search Report dated Feb. 9, 2021 in International Application No. PCT/JP2020/044283.
(Continued)

*Primary Examiner* — Scott A Rogers
(74) *Attorney, Agent, or Firm* — Sughrue Mion, PLLC

(57) ABSTRACT

There are provided a conversion processing method of performing LUT conversion processing for converting, via a lookup table (LUT), texture characteristic information of an object of which texture is to be reproduced into ink amount information of an ink, which is used in order to reproduce the object of which texture is to be reproduced on a medium, the conversion processing method for optical texture reproduction in which the texture characteristic information is separated into internal scattering information and color signal information, the internal scattering information and the color signal information, which are separated out, are used as inputs of the LUT conversion processing, and as values of a modulation transfer function as the internal scattering information and the color signal information are used in the LUT conversion processing, reproduction of internal scattering and reproduction of color reproduction, which are important qualities of texture, can be simultaneously realized with high accuracy in print production of performing texture reproduction, a printed material production method, and a printed material production system.

20 Claims, 11 Drawing Sheets

(52) U.S. Cl.
CPC ..... *H04N 1/00034* (2013.01); *H04N 1/00045* (2013.01); *H04N 1/00068* (2013.01); *H04N 1/6019* (2013.01); *H04N 1/6025* (2013.01)

(56) References Cited

U.S. PATENT DOCUMENTS

| | | | |
|---|---|---|---|
| 9,866,729 B2* | 1/2018 | Nishikawa | ............ H04N 1/6019 |
| 2010/0110462 A1* | 5/2010 | Arai | ...................... G06T 15/506 |
| | | | 358/1.9 |
| 2013/0216245 A1* | 8/2013 | Hoshi | ................. G03G 15/5029 |
| | | | 399/45 |
| 2016/0109364 A1* | 4/2016 | Oh | ..................... G03G 15/0409 |
| | | | 356/369 |
| 2018/0059645 A1 | 3/2018 | Arai | |
| 2018/0264838 A1 | 9/2018 | Kubo | |
| 2019/0094141 A1 | 3/2019 | Suzuki et al. | |
| 2021/0402796 A1* | 12/2021 | Mizuno | ................... B41J 2/525 |

FOREIGN PATENT DOCUMENTS

| | | |
|---|---|---|
| JP | 2017-052154 A | 3/2017 |
| JP | 2017-208703 A | 11/2017 |
| JP | 2018-036846 A | 3/2018 |

OTHER PUBLICATIONS

International Preliminary Report on Patentability dated May 17, 2022 in International Application No. PCT/JP2020/044283.
Written Opinion of the International Searching Authority dated Feb. 9, 2021 in International Application No. PCT/JP2020/044283.
Tsuyoshi Takatani et al., "Control of translucency by UV printing on translucent material", IPSJ SIG Technical Report, 2018, vol. 2018-CG-169, No. 10, pp. 1-6 (6 pages total).

* cited by examiner

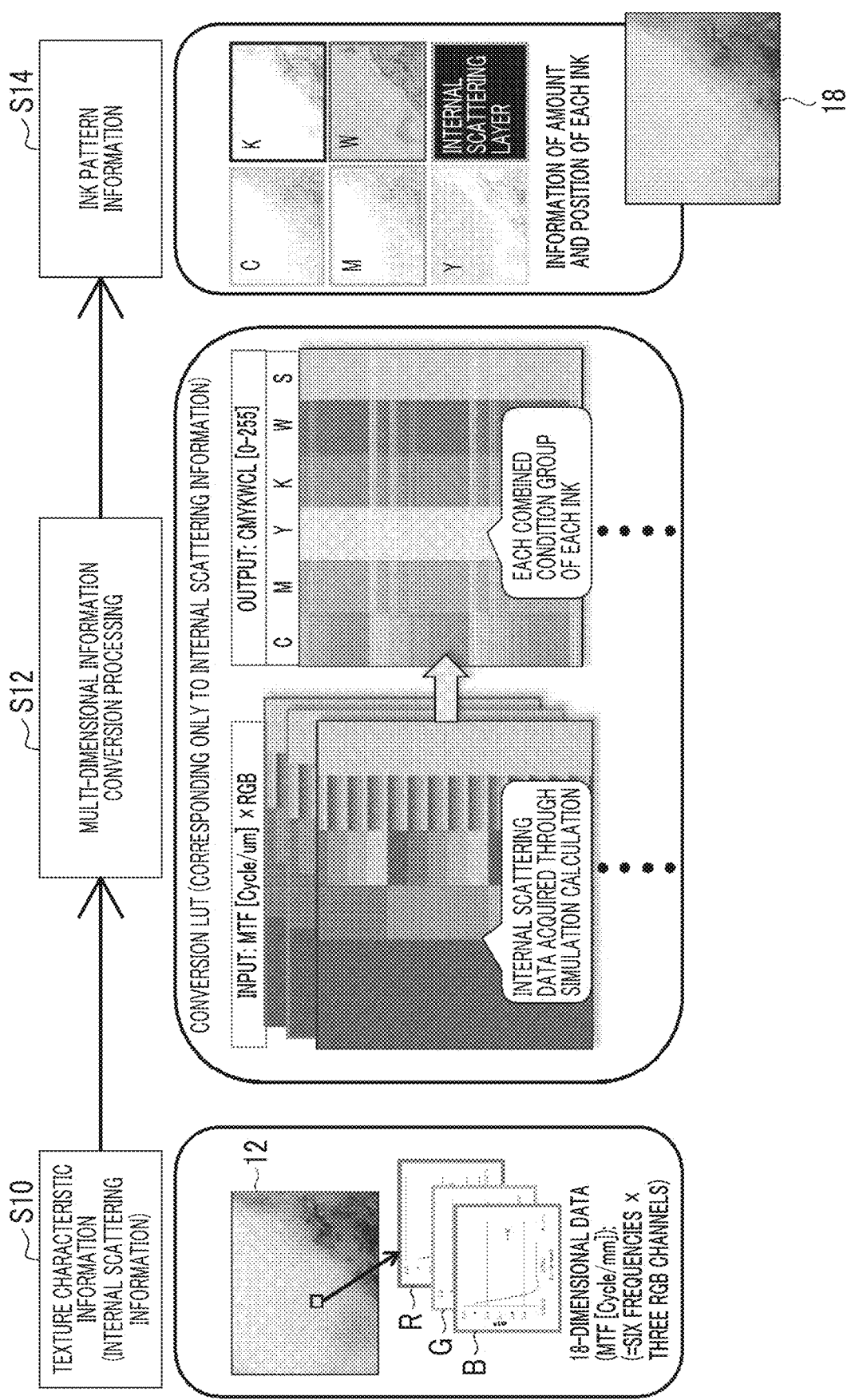

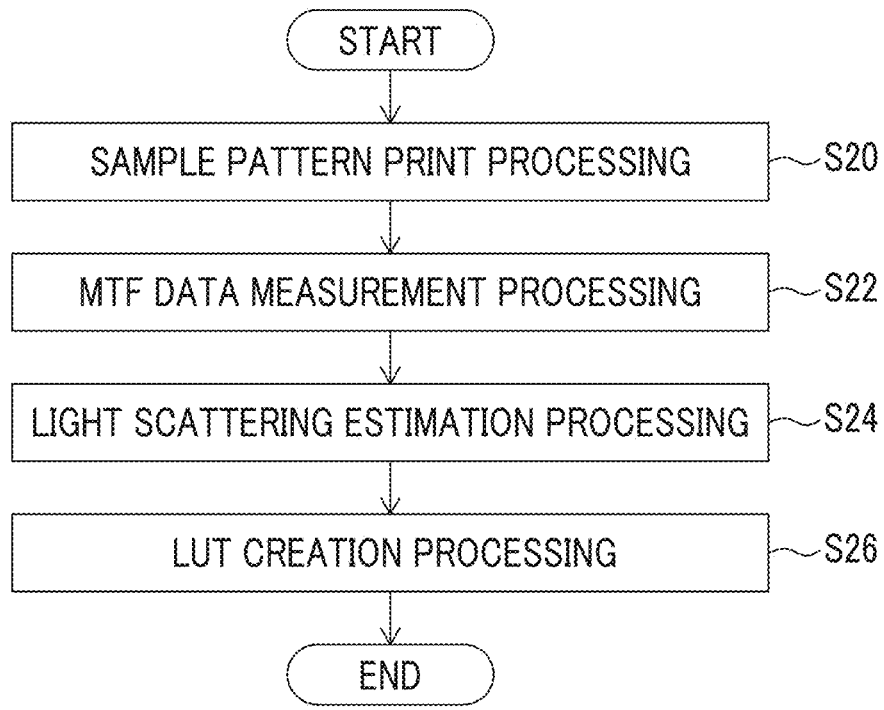
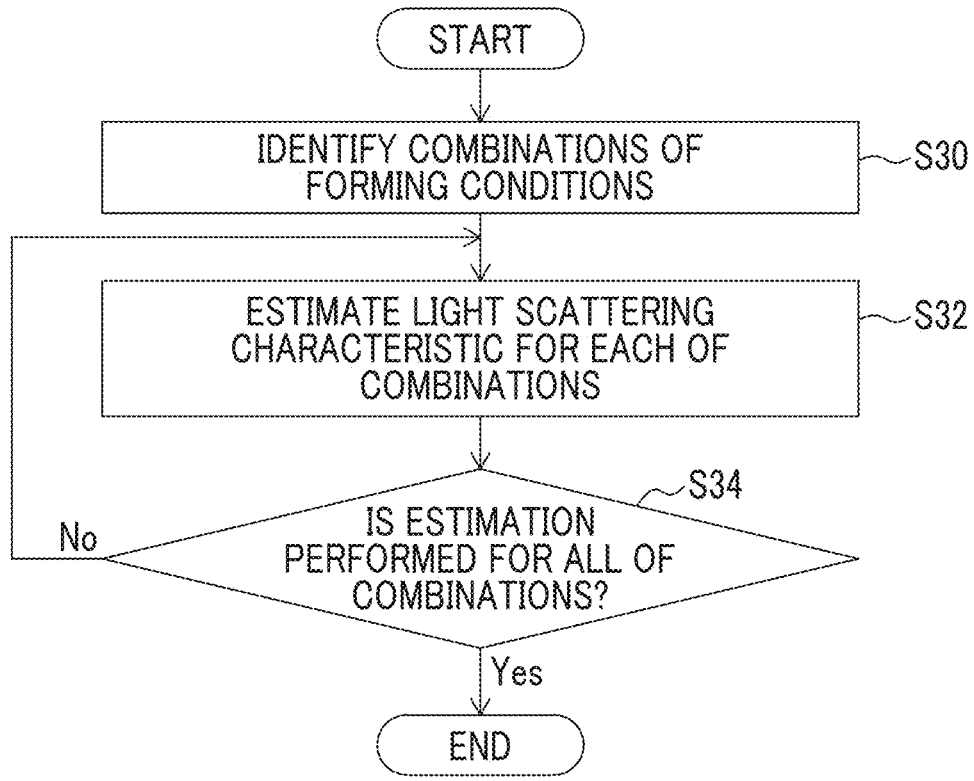

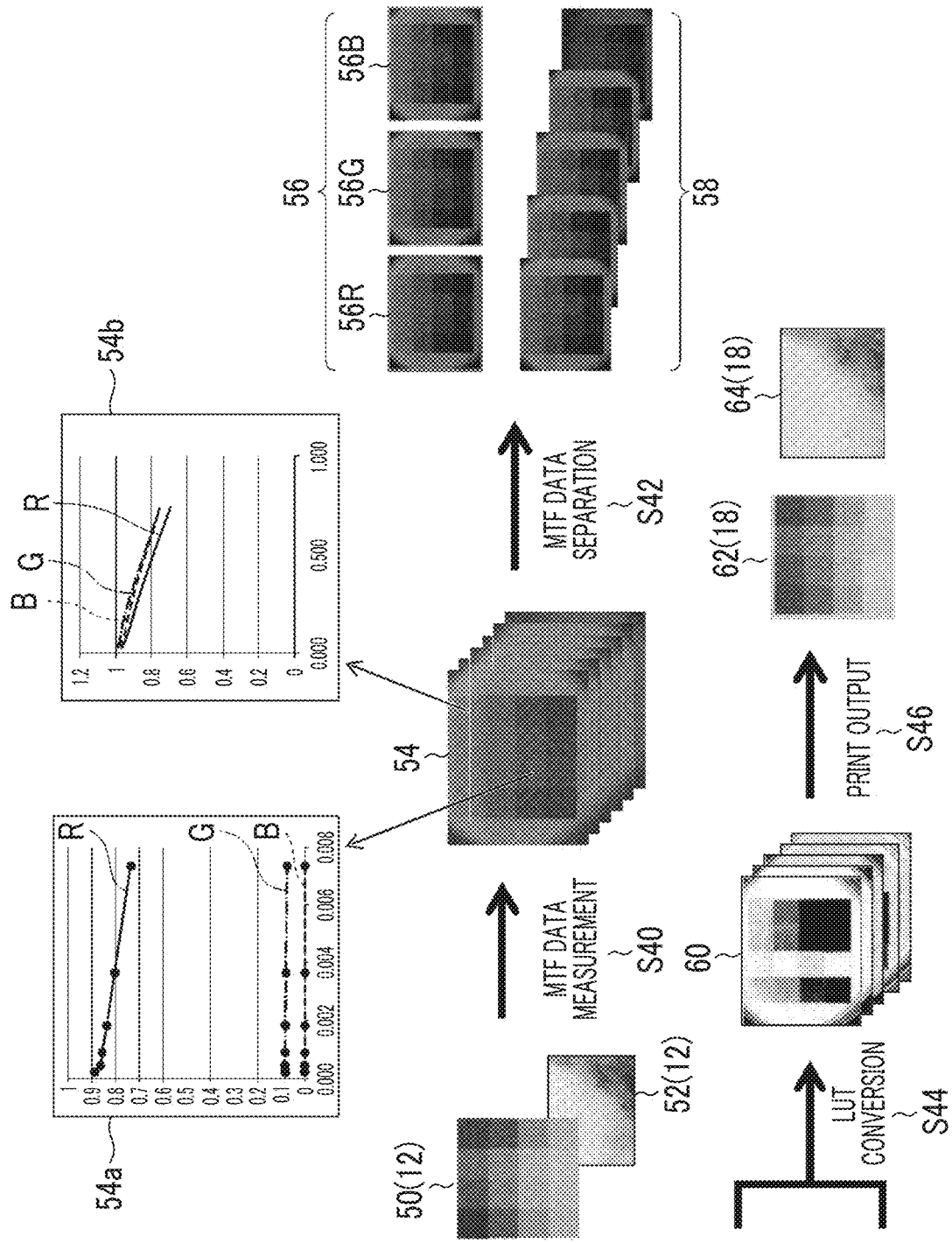

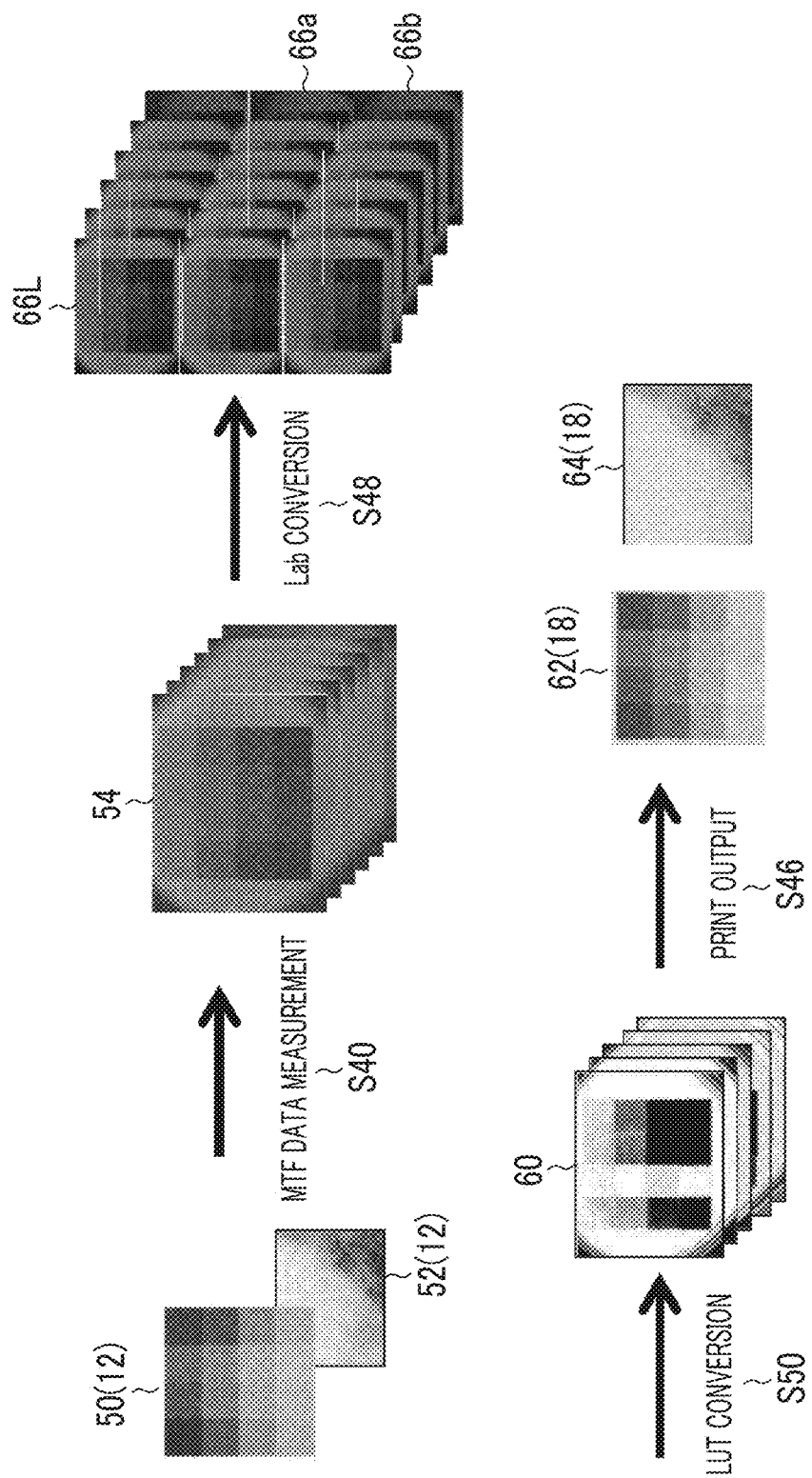

(A)  (B)

CONVERTING TEXTURE INFORMATION OF OBJECT INTO INK AMOUNT INFORMATION, USING VALUES OF AN MTF AS INTERNAL SCATTERING AND COLOR SIGNAL INFORMATION, TO REPRODUCE THE OBJECT AND ITS TEXTURE ON A MEDIUM

CROSS-REFERENCE TO RELATED APPLICATIONS

This application is a Continuation of PCT International Application No. PCT/JP2020/044283 filed on Nov. 27, 2020, which claims priority under 35 U.S.C. § 119(a) to Japanese Patent Application No. 2019-214577 filed on Nov. 27, 2019. The above application is hereby expressly incorporated by reference, in its entirety, into the present application.

BACKGROUND OF THE INVENTION

1. Field of the Invention

The present invention relates to a conversion processing method for optical texture reproduction, a printed material production method for producing a printed material, such as a texture reproduced print in which optical texture is reproduced, and a printed material production system, and particularly to, in producing a printed material such as a texture reproduced print, a conversion processing method for optical texture reproduction that is a data conversion processing technology for simultaneously improving the accuracy of internal scattering and color reproduction, which are texture elements, a printed material production method for producing a printed material such as a texture reproduced print, in which the accuracy of the internal scattering and the color reproduction, which are texture elements, are simultaneously improved and optical texture is reproduced, and a printed material production system.

2. Description of the Related Art

In recent years, with the development of a printing technology, it has become possible to reproduce texture of an object to be reproduced (hereinafter, simply referred to as an "object"). For example, with the development of a three-dimensional (3D) printing technology, the texture (specifically, thickness) of the object can be reproduced well. In addition, with a technology of printing using a clear ink (for example, an ultraviolet ray (UV) ink) having curing properties (hereinafter, referred to as "2.5-dimensional (2.5D) printing" for convenience), the texture of the object, particularly, optical texture of the surface of the object can be reproduced well. Herein, the optical texture specifically corresponds to an internal scattering characteristic of light.

As described above, with the recent development of the 3D printing technology or the 2.5D (thick) printing technology, there has been a high sense of expectation that texture which has not been able to be realized in two-dimensional (2D) printing of the related art will be reproduced as a printed object.

For this reason, various proposals for reproducing the texture of the object have been made (see JP2016-144005A and Control of translucency by UV printing on translucent material/Report by the Information Processing Society of Japan, Vol. 2018-CG-169/No. 10 2018/3/3).

JP2016-144005A proposes an image processing device and an image processing method in which texture reproduction processing for reproducing the texture of the object is performed.

In the technology disclosed in JP2016-144005A, texture data including at least color information and gloss information of an object to be reproduced is input, based on a texture reproduction range of a texture reproduction device, the gloss information is mapped to a gloss reproduction range, the color information is mapped to a color reproduction range with the gloss information after mapping maintained, and an output signal to be output to the texture reproduction device is generated based on the texture data indicated by the color information and the gloss information after mapping.

In this manner, in the technology disclosed in JP2016-144005A, a mismatch between the texture of the object to be reproduced and the texture reproduction range is eliminated, and a reproduced object in which the texture of the object is more appropriately reproduced can be obtained.

In addition, Control of translucency by UV printing on translucent material/Report by the Information Processing Society of Japan, Vol. 2018-CG-169/No. 10 2018/3/3 proposes an image processing device and an image processing method in which texture reproduction processing for reproducing the texture of the object is performed.

In the technology disclosed in Control of translucency by UV printing on translucent material/Report by the Information Processing Society of Japan, Vol. 2018-CG-169/No. 10 2018/3/3, a method of controlling the translucency (optical texture) of a printed material by using a layer structure of a translucent material and an ultraviolet (UV) ray hardened ink without printing the white background is proposed. In the technology disclosed in Control of translucency by UV printing on translucent material/Report by the Information Processing Society of Japan, Vol. 2018-CG-169/No. 10 2018/3/3, in order to express translucency, the modulation transfer function (MTF) is used, MTFs of a translucent material, a UV ink, and a printed material are projected from a projector at a plurality of different spatial frequencies, and reflected light is measured by imaging with a red (R), green (G), and blue (B) camera. In translucency reproduction, based on the measurement, a lookup table (LUT) related to a combination of factors, such as types and overlapping numbers of translucent materials and UV inks, and translucency, is organized, the LUT is searched in an output system, and a combination of factors for realizing required translucency is determined.

In this manner, what is currently being examined is to perform processing of converting an MTF characteristic into the amounts of cyan (C), magenta (M), yellow (Y), and white (W) inks via the LUT in which internal scattering viewed from red (R), green (G), and blue (B) channels is considered.

For example, as shown in FIG. 20, first, projection light at a plurality (six types, in the shown example) of different spatial frequencies is projected onto RGB color patches 50, the reflected light is observed to perform MTF measurement, and MTF data of the RGB channels represented by six types of MTF color patches 54 is obtained. Next, the MTF data of the RGB channels obtained in this manner is LUT-converted, and data of the amounts of CMYW inks represented by a color patch 70 is obtained. A reproduced color patch print 72 obtained by reproducing the color patch 50 is printed out using the data of the amounts of CMYW inks obtained in this manner.

Therefore, for example, from a texture reproduction sample 52 that is an original image, which is an image of marble, a reproduced image print 74 can be obtained by similarly performing MTF measurement, LUT conversion, and printing out.

SUMMARY OF THE INVENTION

However, in the technology disclosed in JP2016-144005A, since gloss to be reproduced is determined from the gloss reproduction range of the texture reproduction device and then the texture reproduction device determines a color to be reproduced from the color reproduction range that can be reproduced with the gloss maintained, in a case of a printed material in which a gloss difference between an object and a reproduced object greatly affects visual impression, the gloss of the object can be reproduced well, but there is a problem that a color error is remarkably visible because colors in a case of being viewed by a human are not sufficiently considered.

In addition, in the technology disclosed in Control of translucency by UV printing on translucent material/Report by the Information Processing Society of Japan, Vol. 2018-CG-169/No. 10 2018/3/3, an LUT for converting the MTF of the RGB channels into the amounts of cyan (C), magenta (M), yellow (Y), and UV (U) inks is used. As described above, there is an unavoidable error in the conversion of the characteristics of the natural world using the LUT consisting of a finite number of inks and a finite amount of ink. For this reason, there is a problem that a color error is remarkably visible in some cases since human visual characteristics, particularly a color difference in a case of being viewed by a human are not considered.

What is currently being examined is, including the examples shown in Control of translucency by UV printing on translucent material/Report by the Information Processing Society of Japan, Vol. 2018-CG-169/No. 10 2018/3/3 and FIG. 20, performing processing of converting an MTF characteristic into the amounts of CMYU inks via an LUT in which internal scattering viewed in the RGB channels is considered. For this reason, in the printed material, such as a circled region 72a of the reproduced color patch print 72 shown in FIG. 20 and the reproduced image print 74, there are problems that color reproduction, which is an important element of texture, is not sufficiently reproduced, graininess is poor, and particularly granular feeling (roughness), grayscale inversion, and/or tone jump is generated.

As shown in FIG. 15, in a case of approximating the MTF in the printed material with respect to a graph of a target MTF, which is close to the intensity of 1 in a period 0, has decreasing intensity as going toward high frequencies, and is indicated by a solid line, a nearest MTF in the LUT is selected in LUT conversion. Thus, an approximate MTF by an ink indicated by a dotted line which is substantially constant at the intensity of approximately 0.5 from the period 0 to a high frequency is selected.

However, in the graph of the MTF, an error of intensity in the period 0 representing an average ink color is large as 0.5, the error with respect to the ink average color is large, and a color difference is remarkably visible.

The present invention is devised in view of such circumstances and an object thereof is to provide a conversion processing method for optical texture reproduction, in which reproduction of internal scattering and reproduction of color reproduction, which are important qualities of texture, can be simultaneously realized with high accuracy in print production of performing texture reproduction, a printed material production method, in which a printed material, such as a texture reproduced print in which optical texture is reproduced with the accuracy of internal scattering and color reproduction, which are texture elements, simultaneously improved, can be produced, and a printed material production system.

In order to achieve the object, according to a first aspect of the present invention, there is provided a conversion processing method of performing lookup table conversion processing for converting, via a lookup table, texture characteristic information of an object of which texture is to be reproduced into ink amount information of an ink, which is used in order to reproduce the object of which texture is to be reproduced on a medium, the conversion processing method including separating the texture characteristic information into internal scattering information and color signal information, and using the internal scattering information and the color signal information, which are separated out, as inputs of the lookup table conversion processing, in which the lookup table conversion processing is processing of using values of a modulation transfer function as the internal scattering information and the color signal information.

In order to achieve the object, according to a second aspect of the present invention, there is provided a printed material production method of producing a printed material obtained by reproducing an object of which texture is to be reproduced on a medium from texture characteristic information of the object of which texture is to be reproduced, the printed material production method including separating the texture characteristic information into internal scattering information and color signal information, using values of a modulation transfer function as the internal scattering information and the color signal information, which are separated out, performing conversion into ink amount information of an ink for forming a print layer obtained by reproducing texture on the medium through lookup table conversion processing, in which a value of the modulation transfer function as the internal scattering information and a value of the modulation transfer function as the color signal information are used as inputs, and producing the printed material by discharging the ink on the medium and forming the print layer based on the ink amount information.

In order to achieve the object, according to a third aspect of the present invention, there is provided a printed material production system that produces a printed material obtained by reproducing an object of which texture is to be reproduced on a medium from texture characteristic information of the object of which texture is to be reproduced, the printed material production system including a light scattering measuring device that acquires the texture characteristic information, a computer that includes a lookup table, performs lookup table conversion processing using the lookup table, and converts the texture characteristic information into ink amount information of an ink, and a print layer forming device that forms the print layer by discharging the ink on the medium based on the ink amount information to produce the printed material, in which the computer separates the texture characteristic information acquired by the light scattering measuring device into internal scattering information and color signal information, uses values of a modulation transfer function as the internal scattering information and the color signal information, which are separated out, and performs conversion into the ink amount information of the ink for forming a print layer obtained by reproducing texture on the medium through the lookup table conversion processing, in which a value of the modulation transfer function as the internal scattering information and a value of the modulation transfer function as the color signal information are used as inputs.

In the first to third aspects, it is preferable that a value of the modulation transfer function is acquired as the texture characteristic information, the value of the modulation transfer function acquired as the texture characteristic information is separated into a value of the modulation transfer function as the internal scattering information and a value of the modulation transfer function as the color signal information, and the values of the modulation transfer function acquired as the internal scattering information and the color signal information are used as input values of the lookup table conversion processing.

Alternatively, it is preferable that the values of the modulation transfer function are acquired as the internal scattering information and the color signal information, which are separated out, and the values of the modulation transfer function acquired as the internal scattering information and the color signal information are used as input values of the lookup table conversion processing.

It is preferable that the color signal information is color signal information in which human visual characteristics with respect to lightness, chroma saturation, and color tone are considered.

In addition, it is preferable that a signal value of an L*a*b* color space is used as the visual characteristic.

In addition, it is preferable that in calculation of an error amount in the lookup table conversion processing in which a distance from a lattice point of the lookup table is given, a weight of an error amount of the color signal information and a weight of an error amount of the internal scattering information are different from each other.

In addition, it is preferable that in a ratio between the color signal information and the internal scattering information, which is a weight of the modulation transfer function, a weight of the color signal information is large.

In addition, it is preferable that the weight of the color signal information is two times or more a weight of the internal scattering information.

In order to achieve the object, according to a fourth aspect of the present invention, there is provided a conversion processing method of performing lookup table conversion processing for converting, via a lookup table, texture characteristic information of an object of which texture is to be reproduced into ink amount information of an ink, which is used in order to reproduce the object of which texture is to be reproduced on a medium, the method including using, as an input value of the lookup table conversion processing, a signal value of a perceptual uniform color space changed from a value of a modulation transfer function that is internal scattering information and color signal information, which are included in the texture characteristic information, in an imaged RGB signal value.

In order to achieve the object, according to a fifth aspect of the present invention, there is provided a printed material production method of producing a printed material obtained by reproducing an object of which texture is to be reproduced on a medium from texture characteristic information of the object of which texture is to be reproduced, the printed material production method including changing a value of a modulation transfer function that is internal scattering information and color signal information, which are included in the texture characteristic information, in an imaged RGB signal value into a signal value of a perceptual uniform color space, performing conversion into ink amount information of an ink for forming a print layer obtained by reproducing texture on the medium through lookup table conversion processing, using the signal value as an input value, and producing the printed material by discharging the ink on the medium and forming the print layer based on the ink amount information.

In order to achieve the object, according to a sixth aspect of the present invention, there is provided a printed material production system that produces a printed material obtained by reproducing an object of which texture is to be reproduced on a medium from texture characteristic information of the object of which texture is to be reproduced, the printed material production system including a light scattering measuring device that acquires the texture characteristic information, a computer that includes a lookup table, performs lookup table conversion processing using the lookup table, and converts the texture characteristic information into ink amount information of an ink, and a print layer forming device that forms the print layer by discharging the ink on the medium based on the ink amount information to produce the printed material, in which the computer changes values of a modulation transfer function that is internal scattering information and color signal information, which are included in the texture characteristic information acquired by the light scattering measuring device, in imaged RGB signal values into a signal value of a perceptual uniform color space, and performs conversion into the ink amount information of the ink for forming a print layer obtained by reproducing texture on the medium through the lookup table conversion processing, using the signal value as an input value.

In the fourth to sixth aspects, it is preferable that the perceptual uniform color space is an L*a*b* color space.

In the first to sixth aspects, it is preferable that the internal scattering information is converted into amounts of cyan (C), magenta (M), yellow (Y), and black (K) inks and an amount of a white (W) ink and a scattering amount of a scattering layer included in the medium through the lookup table conversion processing.

In addition, it is preferable that the texture characteristic information is red (R), green (G), and blue (B) signal values at a plurality of frequencies including zero frequency, the color signal information is red (R), green (G), and blue (B) signal values at zero frequency, and the internal scattering information is red (R), green (G), and blue (B) signal values at a plurality of frequencies excluding zero frequency.

With the present invention, in print production of performing texture reproduction, the reproduction of internal scattering and the reproduction of color reproduction, which are important qualities of texture, can be simultaneously realized with high accuracy.

With the present invention, a printed material such as a texture reproduced print, in which optical texture is reproduced with the accuracy of internal scattering and color reproduction, which are texture elements, simultaneously improved, can be produced.

BRIEF DESCRIPTION OF THE DRAWINGS

FIG. 9 is a diagram showing an example of a flow of LUT conversion processing using a texture reproduction conversion LUT used in the present invention.

FIG. 10 is a flowchart showing an example of conversion LUT creation processing of creating the texture reproduction conversion LUT used in the present invention.

FIG. 11 is a flowchart showing an example of a flow of light scattering estimation processing shown in FIG. 10.

FIG. 12 is a diagram showing an example of a processing flow of texture reproduced print production in which the conversion processing method of the embodiment of the present invention is executed.

FIG. 13 is a diagram showing another example of the processing flow of the texture reproduced print production in which the conversion processing method of the embodiment of the present invention is executed.

Figure 17:
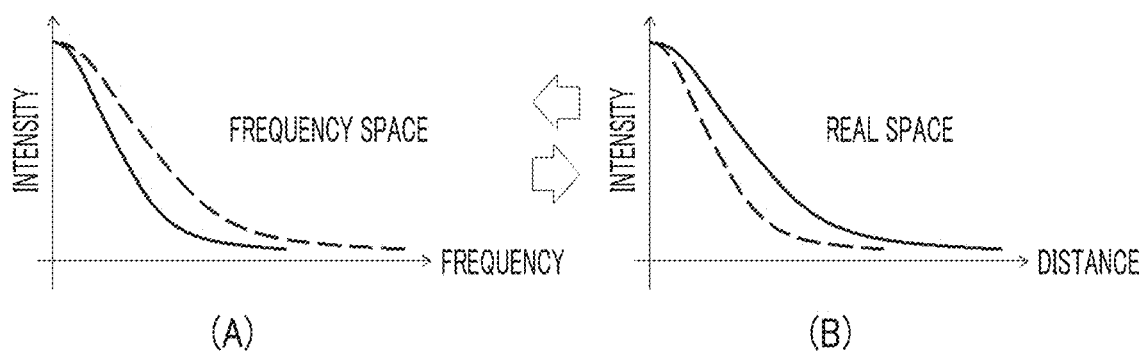

(A) of FIG. 17 is an example of a graph showing an MTF in a frequency space, and (B) of FIG. 17 is an example of a graph showing a point spread function (PSF) in a real space.

Figure 18:
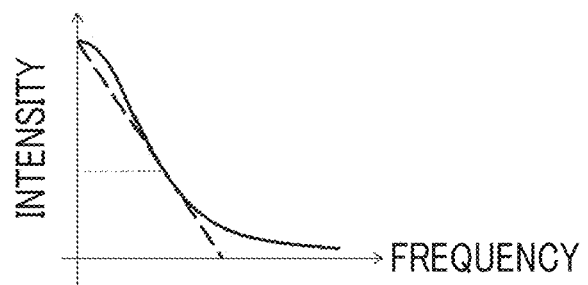

FIG. 18 is an example of a graph showing two MTFs having almost the same half-width.

Figure 19:
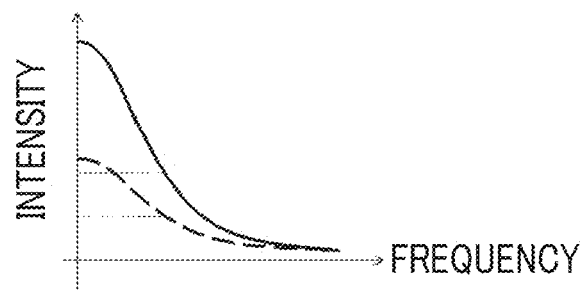

FIG. 19 is another example of a graph showing two MTFs having almost the same half-width.

Figure 20:
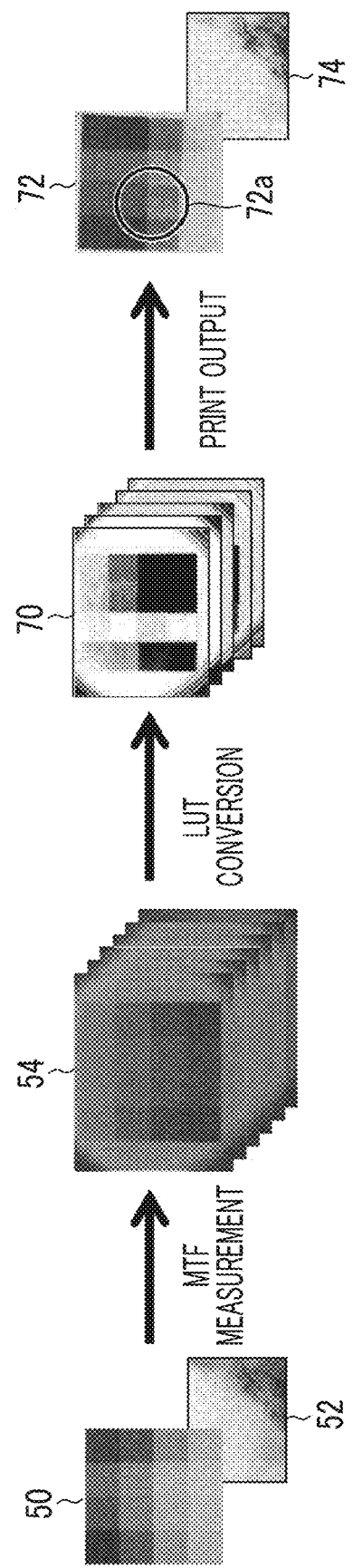

FIG. 20 is a diagram showing a processing flow in an optical texture reproduction method of the related art.

DESCRIPTION OF THE PREFERRED EMBODIMENTS

A conversion processing method for optical texture reproduction according to embodiments of the present invention will be described in detail below based on suitable embodiments shown in the accompanying drawings.

The embodiments to be described below are merely examples given in order to facilitate understanding of the present invention, and are not to limit the present invention. That is, the present invention is not limited without departing from the gist thereof, and can be changed or improved from the embodiments to be described below. In addition, it is evident that the present invention includes the equivalent thereof.

In addition, in the present specification, a numerical range represented by using "to" means a range including numerical values before and after "to" as a lower limit value and an upper limit value.

In addition, in the present specification, unless stated otherwise, a lamination direction of a print layer to be described later will be defined as an up-and-down direction, a side closer to a medium will be defined as "lower side", and a side further from the medium will be defined as "upper side".

Outline of Present Invention

There is provided a conversion processing method for optical texture reproduction according to a first embodiment of the present invention, of performing lookup table (hereinafter, referred to as LUT) conversion processing for converting, via an LUT, texture characteristic information of an object of which texture is to be reproduced into ink amount information of an ink, which is used in order to reproduce the object of which texture is to be reproduced on a medium, the conversion processing method including separating the texture characteristic information into internal scattering information and color signal information, and using the internal scattering information and the color signal information, which are separated out, as inputs of the LUT conversion processing, in which the LUT conversion processing is processing of using values of a modulation transfer function (hereinafter, referred to as MTF) as the internal scattering information and the color signal information.

There is provided a conversion processing method for optical texture reproduction according to a second embodiment of the present invention, of performing LUT conversion processing for converting, via an LUT, texture characteristic information of an object of which texture is to be reproduced into ink amount information of an ink, which is used in order to reproduce the object of which texture is to be reproduced on a medium, the method including using, as an input value of the LUT conversion processing, a signal value of a perceptual uniform color space changed from a value of an MTF that is internal scattering information and color signal information, which are included in the texture characteristic information, in an imaged RGB signal value.

In the conversion processing method according to the first and second embodiments of the present invention, optical texture reproduction that is more excellent than in the technology of the related art described above is possible in that a conversion LUT, in which a color difference in a case of being viewed by a human is considered, is used.

The conversion processing method of the embodiments of the present invention is used in order to produce a printed material in which the optical texture, for example, surface texture of the object of which texture is to be reproduced is reproduced, that is, a printed object produced using an ink. For example, the conversion processing method can be used in producing a printed material (printed object) having both of internal scattering and color reproduction with high accuracy as in 3D printing and 2.5D printing for reproducing texture (printing of laminating inks).

The conversion processing method of the embodiment of the present invention realizes texture by internal scattering that cannot be realized in 2D printing of the related art and demonstrates an effect in which image quality degradation that is caused by partial fluctuations in color information, such as grayscale inversion and/or graininess or color shift, and that aggravates by performing texture reproduction, in which visual characteristics with respect to color information are not considered in a image quality, which is an important item in terms of image quality in the related art, can be reduced.

In addition, the conversion processing method of the embodiment of the present invention demonstrates another effect of performing reproduction in which a texture item that emphasizes reproduction according to the purpose is selected by separating internal scattering information and color reproduction information from each other.

Further, the conversion processing method of the embodiment of the present invention demonstrates still another effect of producing a printed material (printed object) on which texture processing is performed through processing of emphasizing internal scattering more than the reality, in addition to the object of faithful reproduction.

There is provided a printed material production method according to a third embodiment of the present invention, of producing a printed material obtained by reproducing an object of which texture is to be reproduced on a medium from texture characteristic information of the object of which texture is to be reproduced, the printed material production method including separating the texture characteristic information into internal scattering information and color signal information, using values of an MTF as the internal scattering information and the color signal information, which are separated out, performing conversion into ink amount information of an ink for forming a print layer obtained by reproducing texture on the medium through LUT conversion processing, in which a value of the modulation transfer function as the internal scattering information and a value of the MTF as the color signal information are used as inputs, and producing the printed material by discharging the ink on the medium and forming the print layer based on the ink amount information.

There is provided a printed material production method according to a fourth embodiment of the present invention, of producing a printed material obtained by reproducing an object of which texture is to be reproduced on a medium from texture characteristic information of the object of which texture is to be reproduced, the printed material production method including changing a value of an MTF that is internal scattering information and color signal information, which are included in the texture characteristic information, in an imaged RGB signal value into a signal value of a perceptual uniform color space, performing conversion into ink amount information of an ink for forming a print layer obtained by reproducing texture on the medium through LUT conversion processing, using the signal value as an input value, and producing the printed material by discharging the ink on the medium and forming the print layer based on the ink amount information.

There is provided a printed material production system according to a fifth embodiment of the present invention that produces a printed material obtained by reproducing an object of which texture is to be reproduced on a medium from texture characteristic information of the object of which texture is to be reproduced, the printed material production system including a light scattering measuring device that acquires the texture characteristic information, a computer that includes an LUT, performs LUT conversion processing using the LUT, and converts the texture characteristic information into ink amount information of an ink, and a print layer forming device that forms the print layer by discharging the ink on the medium based on the ink amount information to produce the printed material, in which the computer separates the texture characteristic information acquired by the light scattering measuring device into internal scattering information and color signal information, uses values of an MTF as the internal scattering information and the color signal information, which are separated out, and performs conversion into the ink amount information of the ink for forming a print layer obtained by reproducing texture on the medium through the LUT conversion processing, in which a value of the MTF as the internal scattering information and a value of the MTF as the color signal information are used as inputs.

There is provided a printed material production system according to a sixth embodiment of the present invention that produces a printed material obtained by reproducing an object of which texture is to be reproduced on a medium from texture characteristic information of the object of which texture is to be reproduced, the printed material production system including a light scattering measuring device that acquires the texture characteristic information, a computer that includes an LUT, performs LUT conversion processing using the LUT, and converts the texture characteristic information into ink amount information of an ink, and a print layer forming device that forms the print layer by discharging the ink on the medium based on the ink amount information to produce the printed material, in which the computer changes values of an MTF that is internal scattering information and color signal information, which are included in the texture characteristic information acquired by the light scattering measuring device, in imaged RGB signal values into a signal value of a perceptual uniform color space, and performs conversion into the ink amount information of the ink for forming a print layer obtained by reproducing texture on the medium through the LUT conversion processing, using the signal value as an input value.

The printed material production method according to the third embodiment of the present invention and the printed material production system according to the fifth embodiment of the present invention execute the conversion processing method according to the first embodiment of the present invention, and the printed material production method according to the fourth embodiment of the present invention and the printed material production system according to the sixth embodiment of the present invention execute the conversion processing method according to the second embodiment of the present invention.

The printed material production method and the printed material production system according to the embodiments of the present invention can produce the printed material in which the optical texture, for example, surface texture of the object of which texture is to be reproduced is reproduced, that is, the printed object produced using the ink, for example, the printed material (printed object) having both of internal scattering and color reproduction with high accuracy as in 3D printing and 2.5D printing (printing of laminating inks) for reproducing texture.

The printed material production method and system of the embodiments of the present invention demonstrate the same effects as in the conversion processing method of the embodiments of the present invention.

Configuration of Print System That Executes Conversion Processing Method of Present Invention First, a printed material production system that executes the conversion processing method for optical texture reproduction according to the embodiment of the present invention, that is, a configuration of the print system will be described.

Figure 1:
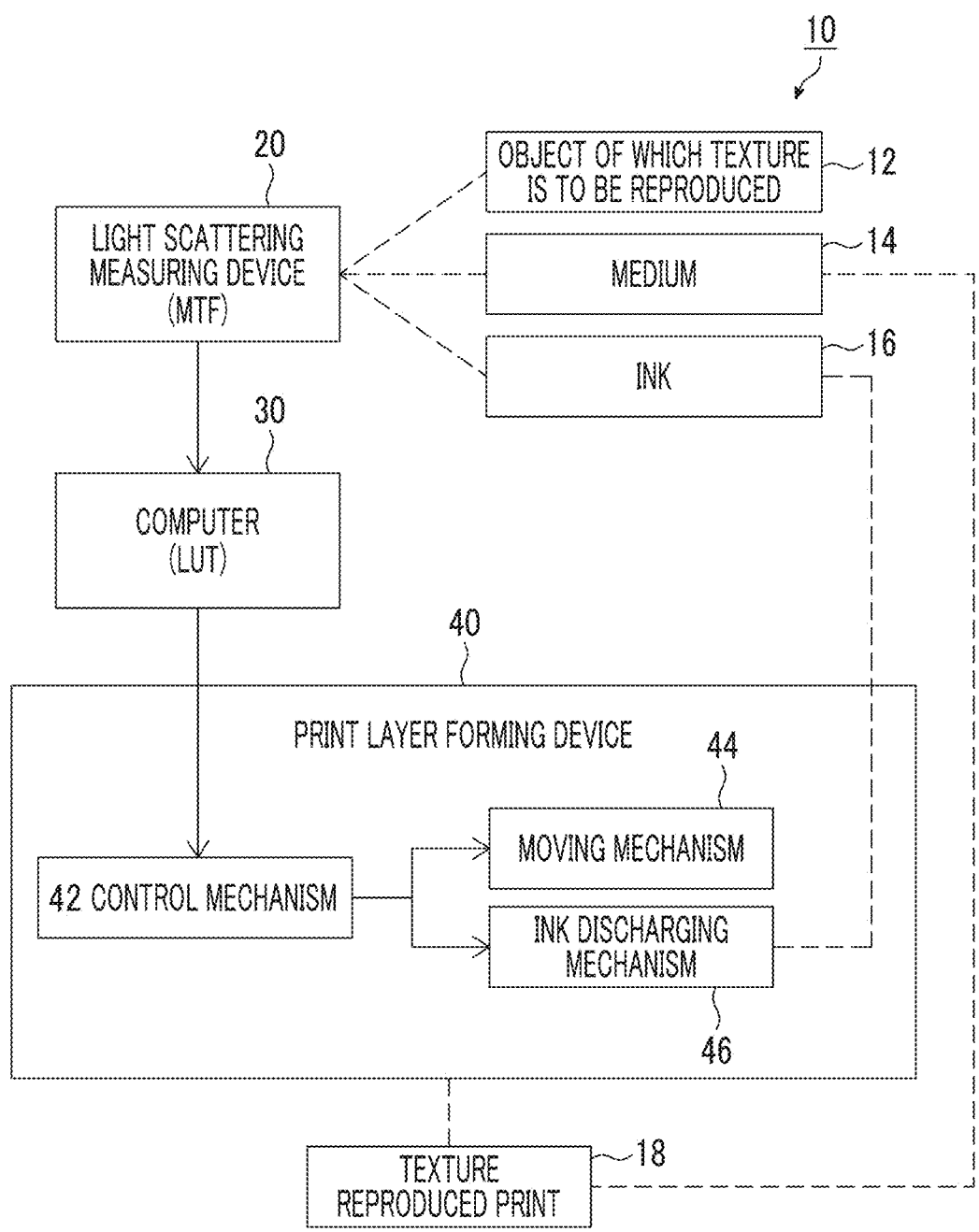
FIG. 1 is a configuration diagram showing a configuration of a print system that executes a conversion processing method according to an embodiment of the present invention.

FIG. 1 is a configuration diagram showing the configuration of the print system that executes the conversion processing method according to the embodiment of the present invention.

A print system 10 shown in FIG. 1 is a facility that reproduces optical texture of an object of which texture is to be reproduced 12 and in a strict sense, produces a texture reproduced print 18 obtained by reproducing the optical texture on a medium 14 using an ink 16.

Object of Which Texture is to Be Reproduced

First, in the present invention, the "object of which texture is to be reproduced" 12 is a member which is a target of texture reproduction and hereinafter, will also be simply referred to as the object 12. Examples of the object include a material having surface texture (in a strict sense, optical texture) that is different depending on a part and specifically include natural materials such as rocks, including marble and granite, stones, wood, hair, bones, skin, teeth, cotton, and silk.

That is, the conversion processing method of the embodiment of the present invention is particularly useful in printing in which texture of a thing having internal scattering is reproduced, such as stone materials, including marble, skin, and teeth.

Hereinafter, although marble is considered as a typical example of the object 12, it is evident that other materials may be used as the object 12.

In addition, in the present invention, "texture" is optical texture, and "texture characteristic information" has, for example, internal scattering information represented by light scattering and color signal information.

Figure 2:
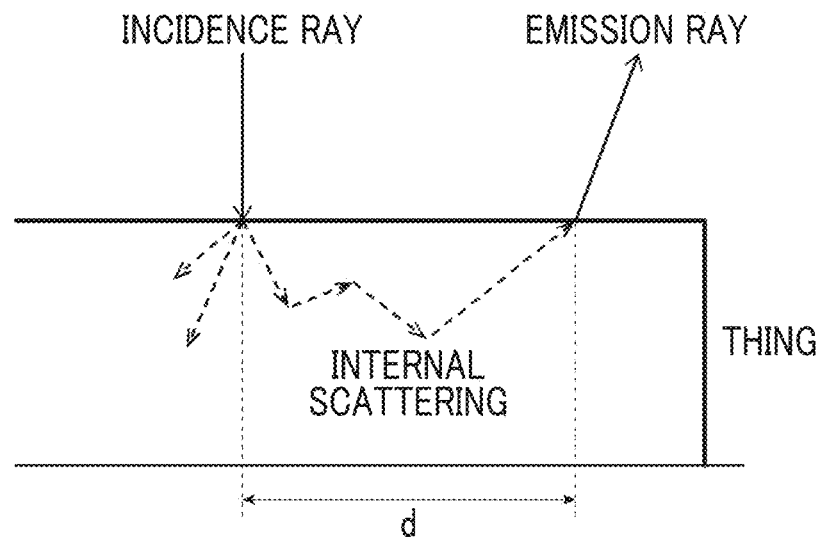
FIG. 2 is a schematic diagram showing an internal scattering phenomenon of light.

Light scattering representing internal scattering information is an internal scattering characteristic (also referred to as subsurface scattering) of light. Internal scattering is, in a case where a thing is irradiated with light, emission of the light from a position separated from a light incidence position to the surface of the thing as the light repeats reflection and scattering inside the thing as shown in FIG. 2. In addition, an internal scattering characteristic of light is identified based on a distance (a distance d shown in FIG. 2) from the light incidence position to an emission position and intensity of the light at the emission position. Light scattering data is represented as internal scattering information.

Insofar as the color of the object 12 can be expressed, color signal information may be any information or may be various signal values of a color space. For example, the color signal information may be three primary colors of light consisting of red (R), green (G), and blue (B). In addition, the color signal information is preferably color signal information in which human visual characteristics with respect to three attributes of colors, including lightness, chroma saturation, and color tone, are considered, and in this case, signal values of the L*a*b* color space standardized by the International Commission on Illumination (CIE) in 1976 are preferably used as visual characteristics. In addition, the color signal information may be a signal value of a perceptual uniform color space. In this case, it is preferable that the perceptual uniform color space is the L*a*b* color space.

Texture Reproduced Print

In addition, in the present invention, the "texture reproduced print" 18 is a printed material obtained by reproducing the optical texture of the object 12 on the surface of the medium 14 using the ink 16. On the surface of the texture reproduced print 18 (a surface on a visible side), the surface texture of the object 12, that is, colors, light scattering, and patterns are reproduced.

Figure 3:
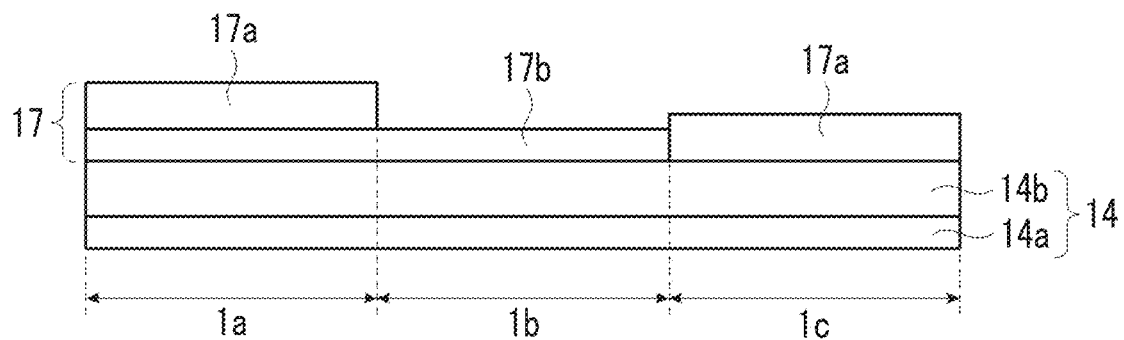
FIG. 3 is a schematic diagram showing a configuration of a texture reproduced print.

Executing the conversion processing method of the embodiment of the present invention is executing texture reproduced printing of forming a print layer 17 consisting of the ink 16 on the medium 14 in order to reproduce the surface texture of the object 12 described above. Through the texture reproduced printing, the texture reproduced print 18 shown in FIG. 3 is produced. In FIG. 3, a configuration of the texture reproduced print 18 is schematically shown, and for convenience of illustration, the thickness and size of each portion are different from the actual content.

As shown in FIG. 3, the texture reproduced print 18 is composed of the medium 14 and the print layer 17 formed on the surface (print surface) of the medium 14.

Medium

The "medium" 14 is a substrate for the texture reproduced print 18 shown in FIG. 3, is a texture reproduced printing substrate, and has light scattering. The medium 14 used in texture reproduction printing is the medium 14 for texture reproduction printing.

The medium 14 for texture reproduction is a laminate composed of a thin plate-shaped internal scattering member 14b being laminated on white paper, which is a white medium 14a.

The internal scattering member 14b is a layer having light scattering in the medium 14. Therefore, by having the internal scattering member 14b having different light scattering, the medium 14 have different light scattering.

Herein, the internal scattering member 14b is a translucent (for example, semi-dull color or milky-white color) light-transmitting member and is a member of which a difference between total light transmittance and scattered light transmittance is 0% to 10%. Specific examples of the internal scattering member 14b include a milky-white or white acrylic plate and a substrate used in inkjet printing using a ultraviolet curable ink, such as a vinyl chloride material and a polyethylene terephthalate (PET) material. As the internal scattering member 14b, a member having total light transmittance of 10% to 80% or less and transmitted light transmittance of 10% to 80% is preferable. In addition, for the internal scattering member 14b, a Haze value is preferably 1 to 90%, and more preferably, the Haze value may be 30 to 60%.

Although the thickness of each portion of the internal scattering member 14b is homogeneous in the present embodiment, without being limited thereto, the thickness of each portion of the internal scattering member 14b may be changed without being homogeneous.

On the other hand, white paper, which is the white medium 14a, configures a lowermost layer of the texture reproduced print 18. The white medium 14a is closely attached to the internal scattering member 14b and is adhered to, for example, the surface of the internal scattering member 14b. However, the white medium 14a is not limited to a case of being adhered to the internal scattering member 14b and may be in contact with the internal scattering member 14b. In addition, it is preferable to set the white medium 14a such that light reflectivity is highest in the texture reproduced print 18 and the reflectivity is 90% or more. In addition, the white medium 14a is not limited to white paper, and it is possible to use a white sheet, a film, a plate material, a fiber body (cloth), and a plastic substrate (for example, an acrylic material, polyethylene terephthalate (PET), and a vinyl chloride material) instead.

The medium 14 for texture reproduction is not limited to the substrate having the white medium 14a and the internal scattering member 14b and may be, for example, the internal scattering member 14b alone or may be a medium having a member other than the white medium 14a and the internal scattering member 14b. In addition, although the thickness of each portion of the white medium 14a is homogeneous in the present embodiment, without being limited thereto, the thickness of each portion of the white medium 14a may be changed without being homogeneous.

The print layer 17 consists of a multilayer structure in which layers of inks landed (adhered) on the surface of the medium 14, which is a print surface, are laminated. In addition, the print layer 17 is formed on the print surface of the medium 14 based on data (specifically, color signal information and internal scattering information to be described later) related to the surface texture of the object 12.

Ink

Examples of the "ink" 16 used in the present invention include three color inks, including cyan (C), magenta (M), and yellow (Y), which are color fluids, a black (K) ink, which is a black fluid, and a white (W) ink, which is a white fluid, but a clear ink, which is a transparent fluid, may be used in addition thereto. The clear ink is not always used in order to form the print layer 17 in the present invention, but the clear ink can be used insofar as the clear ink is effective in reproducing the optical texture.

Herein, the color ink is a general ink that contains a colored pigment or dye and is used in color printing. The black ink is a black ink that contains carbon black at a high concentration. The white ink is a white ink that contains a white pigment or scatterer and is used in, for example, underprinting. The clear ink is an ultraviolet ray hardening fluid that hardens by receiving light (specifically, ultraviolet rays). The clear ink may be a transparent fluid that can be hardened by irradiation with light. In addition, examples of irradiation light include ultraviolet rays, infrared rays, and visible rays.

In addition, in the present invention, a range of the print surface, in which the print layer 17 is formed, is divided into a plurality of unit regions, and the print layer 17 is formed in an image-wise manner according to the position of each unit region as shown in FIG. 3. Accordingly, texture reproduced on the texture reproduced print 18 changes according to each portion of the texture reproduced print 18. In other words, texture at each portion of the texture reproduced print 18 is determined by a structure (layer structure) in each portion in the print layer 17.

Herein, a unit region, which is a unit in a case of dividing the range of the print surface, in which the print layer 17 is formed, is a minute rectangular region and is a split region set in a case of defining light scattering of an object. To describe more specifically, the unit region is, for example, in a case of measuring light scattering using a camera, a region set in a size corresponding to resolution (pixels) in a case of imaging the surface of the object 12 with the camera or a wider sized region obtained by averaging the size.

To describe the print layer 17 specifically, as shown in FIG. 3, at a part 1a of the texture reproduced print 18, a white layer 17b is disposed on the surface (internal scattering member 14b) of the medium 14, and a color layer 17a is disposed thereon as an outermost layer of the print layer 17. The print layer 17 has a two-layer structure including the white layer 17b and the color layer 17a. The color layer 17a is an ink layer composed of three colors of YMC inks and a black (K) ink. The white layer 17b is an ink layer composed of a white (W) ink.

Next, at a part 1b of the texture reproduced print 18, only the white layer 17b is disposed on the internal scattering member 14b of the medium 14, and the white layer 17b is disposed on the outermost layer of the print layer 17.

In addition, at a part 1c of the texture reproduced print 18, only the color layer 17a is disposed on the internal scattering member 14b of the medium 14, and the color layer 17a is disposed on the outermost layer of the print layer 17.

Such a white layer 17b is disposed in the print layer 17 at a position according to texture characteristic information (specifically, color signal information and internal scattering information) related to the surface texture of the object 12. To describe specifically, forming conditions of the print layer 17 is set based on the two types of information, and as a result of forming the print layer 17 in accordance with the forming conditions, the white layer 17b is disposed in an image-wise manner in the print layer 17.

To describe in more detail with reference to FIG. 3, at the part 1a of the texture reproduced print 18, which corresponds to a color portion, the white layer 17b is disposed between the color layer 17a and the internal scattering member 14b of the medium 14, and the white layer 17b is adjacent to the color layer 17a immediately below the color layer 17a as shown in FIG. 3. By providing the white layer 17b immediately below the color layer 17a as described above, light incident from above the color layer 17a is reflected from the white layer 17b after the color layer 17a transmits the light. Accordingly, the light which has passed through the color layer 17a can be relatively clearly seen by a viewer by being efficiently reflected, without being scattered and absorbed. Accordingly, at the part 1a corresponding to the colored portion, for example, in a case where light incident thereto is reflected at a position separated from the incidence position due to internal scattering, light scattering having a not so long distance between the incidence position and the reflected position is reproduced.

In the configuration of the part 1a of FIG. 3, the effect of internal scattering changes according to the thickness of the white layer 17b. That is, as the thickness of the white layer 17b increases, light does not go to the layer of the medium 14, and spread caused by internal scattering decreases. On the contrary, as the thickness of the white layer 17b decreases, the spread of the light caused by internal scattering affected by the layer of the medium 14 increases.

In addition, at the part 1b of the texture reproduced print 18, in which there is no color portion, the white layer 17b is disposed as the outermost layer on the medium 14. By providing the white layer 17b as the outermost layer as described above, light reflection is visible more clearly.

Further, at the part 1c of the texture reproduced print 18, in which there is only the color portion, the color layer 17a is disposed as the outermost layer on the internal scattering member 14b of the medium 14. By providing the color layer 17a as the outermost layer on the internal scattering member 14b, light incident from above the color layer 17a is incident to the internal scattering member 14b after the color layer 17a transmits the light. Thus, the light is scattered and absorbed in the internal scattering member 14b. Accordingly, for example, in a case where light incident thereto is reflected at a position separated from the incidence position due to internal scattering, relatively strong light scattering having a long distance between the incidence position and the reflected position to some extent is reproduced.

In the present invention, texture may be controlled by disposing a black layer made by a K ink in a underlayer of the white layer 17b or disposing a transparent layer made by a clear ink in the underlayer layer thereof.

Print System

Next, hereinafter, the print system 10 will be described.

As shown in FIG. 1, the print system 10 has a light scattering measuring device 20, a computer 30, and a print layer forming device 40 as main configuration devices and produces the texture reproduced print 18 from the object of which texture is to be reproduced 12 as described above.

Hereinafter, each of the configuration devices of the print system 10 will be individually described.

Print Layer Forming Device

First, the print layer forming device 40 will be described.

The print layer forming device 40 is a device that discharges the ink 16, which is a fluid, toward the print surface (that is, an upper surface of the internal scattering member 14b) of the medium 14 and forms the print layer 17 having a multilayer structure on the print surface. In the present embodiment, the print layer forming device 40 is composed of, for example, an inkjet printer.

To describe specifically, the print layer forming device 40 sequentially discharges various types of inks 16 toward each unit region of the print surface (in a strict sense, a range of the print surface, in which the print layer 17 is formed) of the medium 14. In each unit region, dots of the landed inks form ink layers and a plurality of ink layers of each ink type overlap each other. Accordingly, the multilayer structure print layer 17 is formed on the print surface.

Figure 4:
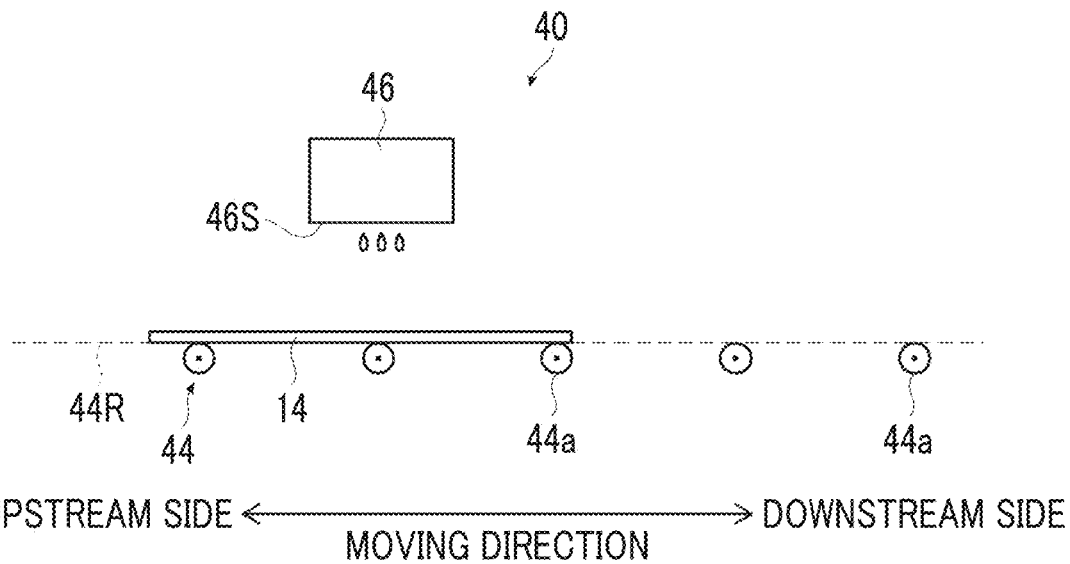
FIG. 4 is a schematic diagram showing a configuration of a print layer forming device shown in FIG. 1.

As shown in FIGS. 1 and 4, the print layer forming device 40 has a control mechanism 42, a moving mechanism 44, and an ink discharging mechanism 46. The moving mechanism 44 moves the medium 14 along a moving path 44R in the print layer forming device 40. As shown in FIG. 4, the moving mechanism 44 may be composed of a drive roller 44a or may be composed of a drive belt.

From a perspective of further increasing a printing speed, the moving mechanism 44 is a one-way transporting moving mechanism that moves the medium 14 only in a forward direction. However, without being limited thereto, the moving mechanism may be a reversible transporting moving mechanism that causes the medium 14 to travel reversely to an upstream side by a certain distance after moving the medium to a downstream side by the same distance along the moving path 44R and then moves the medium to the downstream side again.

Figure 5:
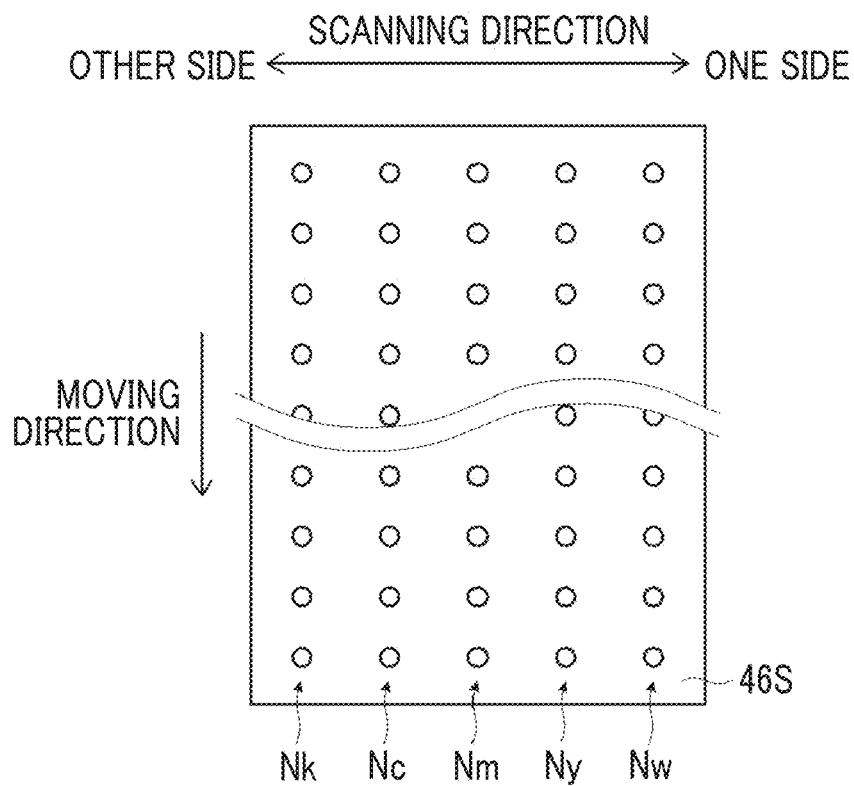
FIG. 5 is a diagram showing a nozzle surface of an ink discharging mechanism included in the print layer forming device shown in FIG. 4.

The ink discharging mechanism 46 is composed of a recording head that discharges the various types of inks 16 through the driving of a piezoelectric element. The ink discharging mechanism 46 discharges the various types of inks 16 toward the print surface as shown in FIG. 4 while a lower surface thereof faces the print surface of the medium 14. To describe more specifically, the ink discharging mechanism 46 is movable in a scanning direction intersecting a moving direction of the medium 14. In addition, as shown in FIG. 5, the lower surface of the ink discharging mechanism 46 is a nozzle surface 46S in which a nozzle row is formed for each ink type. From one end side in the scanning direction, one nozzle row Nw for discharging a white ink, one nozzle row Ny for discharging a yellow ink, one nozzle row Nm for discharging a magenta ink, one nozzle row Nc for discharging a cyan ink, and one nozzle row Nk for discharging a black ink are provided in the nozzle surface 46S. However, the number of nozzle rows discharging various types of inks and disposed positions thereof can be set in any manner, and a configuration other than the configuration shown in FIG. 5 may be adopted.

Then, as the nozzle surface 46S faces the print surface of the medium 14, the ink discharging mechanism 46 discharges a type of ink corresponding to each unit region toward each unit region on the print surface while being moved in the scanning direction at a position immediately above the print surface by a carriage (not shown) through a shuttle scanning method. Various types of inks land on a unit region, which is a discharge destination, and form dots. As a result, on the surface of the medium 14, the print layer 17, in which the color layer 17a and the white layer 17b are disposed in an image-wise manner according to the position of each unit region, is formed.

As a method of discharging an ink from the ink discharging mechanism 46, without being limited to the piezoelectric element drive method, for example, various types of discharge methods can be used including a thermal jet method of ejecting ink droplets at the pressure of bubbles generated by heating an ink with a heat generating body such as a heater. In addition, the ink discharging mechanism 46 is composed of a serial type head and discharges an ink under the shuttle scanning method in the present embodiment, but is not limited thereto. For example, the ink discharging mechanism 46 is composed of a full-line type head, and may discharge an ink under a single-pass method. In addition, all nozzle rows of various types of inks are formed in the same nozzle surface 46S in the present embodiment, but is not limited thereto. For example, a configuration where the ink discharging mechanism 46 consists of a plurality of recording heads and the respective recording heads discharge different types of inks from each other may be adopted.

In a case of forming a transparent layer on the print surface of the medium 14 using a clear ink, it is preferable to have a hardening mechanism. The hardening mechanism irradiates dots of the clear ink landed on the print surface of the medium 14 with light (in a strict sense, ultraviolet rays) and hardens the dots of the clear ink. The hardening mechanism may be composed of, for example, a metal highland lamp, a high pressure mercury lamp, and an ultraviolet ray light emitting diode (LED) and may be disposed on the downstream side from the ink discharging mechanism 46 in the moving direction of the medium 14.

In a case where the hardening mechanism is provided, the ink discharging mechanism 46 and the hardening mechanism are preferably disposed to be spaced apart from each other in the moving direction of the medium 14. However, without being limited thereto, a configuration where the ink discharging mechanism 46 and the hardening mechanism are mounted on a common carriage and the ink discharging mechanism 46 and the hardening mechanism move integrally in the scanning direction may be adopted. In such a configuration, it is preferable that the hardening mechanism is disposed at a position beside the ink discharging mechanism 46, the hardening mechanism irradiates a clear ink (in a strict sense, the dots of the clear ink landed on the print surface) with ultraviolet rays immediately after the ink discharging mechanism 46 has discharged the clear ink in a single scanning operation.

The control mechanism 42 is a controller built in the print layer forming device 40, and controls, via a drive circuit (not shown), each of the moving mechanism 44 and the ink discharging mechanism 46 and further each hardening mechanism in a case where there is the hardening mechanism. To describe more specifically, the control mechanism 42 receives print data sent from the computer 30. The print data is data indicating forming conditions of the print layer 17. The print data will be described specifically later.

For example, in a case where the predetermined medium 14 is manually inserted into a substrate introduction port (not shown) of the print layer forming device 40 immediately after receiving the print data, the control mechanism 42 controls the moving mechanism 44 such that the medium 14 is picked up and is intermittently moved along the moving path 44R.

Next, the control mechanism 42 controls the ink discharging mechanism 46 in accordance with the print data and causes the ink discharging mechanism 46 to discharge the ink 16 toward each unit region of the print surface while the nozzle surface 46S of the ink discharging mechanism 46 and the print surface of the medium 14 face each other. In this case, the type, amount, and density (dot density) of the ink 16 landed on each unit region are determined according to forming conditions indicated by the print data.

In addition, the control mechanism 42 alternately repeats a moving operation of the medium 14 by the moving mechanism 44 and a scanning operation of the ink discharging mechanism 46 and controls a nozzle that discharges the ink 16 in each scanning operation. Accordingly, dots of the ink 16 can be formed in an overlapping manner in the same unit region on the print surface, and for example, it is possible to adjust the thickness of an ink layer consisting of the ink 16 by overlapping the dots of the same type of ink 16. In addition, by overlapping dots of another type of ink 16 on dots of a certain type of ink 16, the multilayer structure described above is formed.

Lamination procedures of each ink layer in the multilayer structure is as described above. For example, at the part 1a corresponding to the color portion and the part 1c having only the color portion, the color layer 17a is disposed as an outermost layer. On the other hand, at the part 1b having no color portion, the white layer 17b is disposed as an outermost layer.

In addition, the control mechanism 42 causes the ink discharging mechanism 46 to discharge the ink 16. In a case where there is the hardening mechanism, in parallel with this, the hardening mechanism is controlled and irradiation with ultraviolet rays is performed. Accordingly, in a unit region where there are dots of a clear ink, the dots of the clear ink are hardened, and a transparent layer is formed.

Then, the control mechanism 42 controls the moving mechanism 44 and the ink discharging mechanism 46 in accordance with the forming conditions indicated by the print data and controls the hardening mechanism in a case where there is the hardening mechanism, and thereby the lamination number of ink layers and the type and thickness of each ink layer are adjusted for each unit region. In other words, each portion of the print layer 17 is formed in an image-wise manner according to the position of each portion. As a result, the surface texture of the object 12 is reproduced on the surface (surface on a visible side) of the print layer 17.

Then, the medium 14 with the print layer 17 formed on the print surface, that is, the texture reproduced print 18 is moved to a discharge port of the print layer forming device 40 by the moving mechanism 44 and is discharged outside the print layer forming device 40 from the discharge port.

Figure 6:
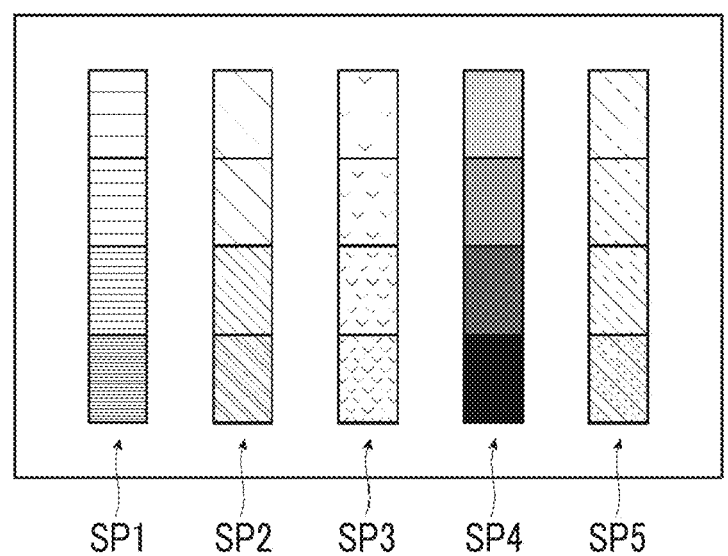
FIG. 6 is a diagram showing a sample pattern.

In addition, it is possible for the print layer forming device 40 according to the present embodiment to form sample patterns SP1 to SP5 shown in FIG. 6 on the medium 14. Each of the sample patterns SP1 to SP5 consists of an ink layer having only one color and one layer, and a printed image necessary for the light scattering measuring device 20 to be described later to measure internal scattering information (light scattering data) for each ink type is formed.

To describe the sample patterns SP1 to SP5, the sample patterns SP1 to SP5 are formed by gradually changing a dot density for each of four YMCK colors of inks and a white ink as shown in FIG. 6. Herein, the dot density means the occupancy rate of dots in a unit area and in other words, is a pattern concentration (shading). The dot density is determined by a dot size and the number of dots in the unit area.

In a case where the print layer forming device 40 forms each of the sample patterns SP1 to SP5 on the medium 14, the control mechanism 42 receives sample pattern forming print data from the computer 30. Forming conditions (specifically, the position of each of the sample patterns SP1 to SP5, the type of ink used, and a dot density) of each of the sample patterns SP1 to SP5 are defined in the sample pattern forming print data. In a case where the sample pattern forming print data is received, the control mechanism 42 controls the moving mechanism 44 and the ink discharging mechanism 46 in accordance with the data. Accordingly, for each ink color, each of the sample patterns SP1 to SP5 is formed on the medium 14 with a dot density gradually changed. The medium 14 used in sample pattern forming may be the medium 14 for texture reproduction or may be the medium 14 (for example, white paper) different from the medium 14 for texture reproduction.

Light Scattering Measuring Device

The light scattering measuring device 20 measures light scattering data which is internal scattering information related to light scattering. In the present invention, a scattering characteristic of light is represented by the modulation transfer function (hereinafter, referred to as the MTF).

Herein, the MTF represents a state of reflected light, in which the intensity (for example, a brightness value) of light incident to a thing decreases due to spread caused by subsurface scattering, as a function, and a vertical axis is the intensity of light and a lateral axis is a spatial frequency. That is, the MTF represents the intensity of light with respect to the spatial frequency of a plurality of types of light having wavelengths different from each other.

The light scattering measuring device 20 measures internal scattering information (light scattering data) indicating light scattering represented by the MTF. Therefore, the light scattering measuring device 20 used in the present invention measures the plurality of types of light having wavelengths different from each other, specifically, a value of the MTF (MTF data) as internal scattering information for each of red (R), green (G), and blue (B) colors of light. In the MTF, the intensity of each of RGB colors of light at a spatial frequency of 0 represents the intensity of average color of each color, and thus can be referred to as color signal information. Therefore, it can be said that the MTF including the intensity of a period 0 includes color signal information and internal scattering information.

To broadly describe a measuring method of MTF data indicating light scattering, an MTF measuring system in which a projector camera system is used can be given as an example as disclosed in Control of translucency by UV printing on translucent material/Report by the Information Processing Society of Japan, Vol. 2018-CG-169/No. 10 2018/3/3. The MTF measuring system projects a sine wave pattern from a projector while changing a spatial frequency in a modulation pattern and images the reflected light with an RGB camera for each of different frequencies. In this case, in three RGB channels, a frequency in the modulation pattern is changed N times from 0 to a predetermined value, and 3×N-dimensional MTF data can be obtained.

Figure 7:
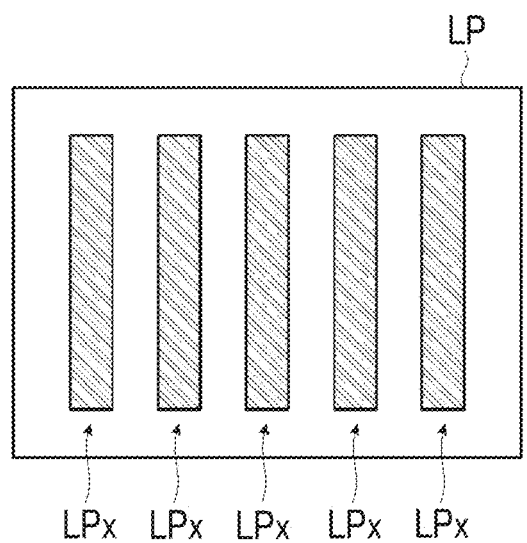
FIG. 7 is a diagram showing a rectangular wave chart.

In addition, as another measuring method of MTF data, for example, internal scattering information (light scattering data) indicating light scattering, which is a measurement target, is obtained through measurement using a rectangular wave chart LP shown in FIG. 7. As shown in FIG. 7, the rectangular wave chart LP is a measurement chart that consists of a plurality of rectangular patterns LPx formed at predetermined intervals in a transparent substrate such as a glass plate. In a case of measuring light scattering, the measurement target and the rectangular wave chart LP are closely attached to each other, light is incident from a rectangular wave chart LP side, and reflected light of the measurement target is measured. In this case, as a result of transmitted light of the rectangular wave chart LP being scattered inside the measurement target, an edge portion of the rectangular pattern LPx is measured to be blurred and slightly darkened. Qualitatively speaking, this blurring degree indicates light scattering of the measurement target. In addition, as a method of quantitatively evaluating the blurring degree, that is, the light scattering of the measurement target, a method of calculating the MTF indicating the light scattering can be used.

A method described in JP2012-205124A is given as an example of a calculating method of the MTF, but without being limited to the method described in the same publication, the MTF indicating light scattering may be acquired through another method.

For example, the MTF indicating light scattering may be acquired using a method described in OPTICS LETTERS/ Vol. 30, No. 11/Jun. 1, 2005, "Modulated imaging: quantitative analysis and tomography of turbid media in the special-frequency domain".

Figure 8:
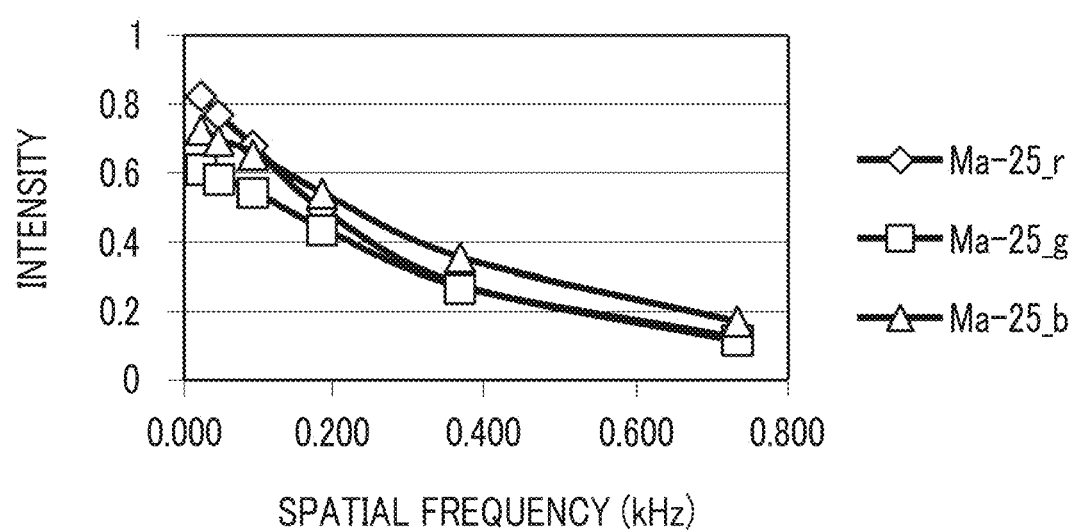
FIG. 8 is a graph showing an example of MTF data.

As described above, the light scattering measuring device 20 can measure MTF data of the measurement target as shown in FIG. 8 by measuring the MTF as internal scattering information representing light scattering of the measurement target using each of three RGB colors of light. FIG. 8 is a graph showing the MTF indicating light scattering of the measured measurement target for each color of light. A lateral axis of FIG. 8 indicates a spatial frequency, and a vertical axis of FIG. 8 indicates the intensity (ratio to the intensity of incidence rays) of reflected light.

Although the MTF represents light scattering and MTF data indicating the measurement result is measured by the light scattering measuring device 20 in the present invention, the present invention is not limited thereto. For example, the light scattering may be represented by the point spread function (PSF) indicating point spread of light, and data indicating the measurement result may be converted into MTF data.

In the present invention, the light scattering measuring device 20 measures light scattering with various members as measurement targets and measures MTF data.

To describe specifically, the light scattering measuring device 20 first measures light scattering with respect to the object of which texture is to be reproduced 12. Accordingly, the light scattering measuring device 20 measures MTF data (hereinafter, also referred to as first MTF data) related to the light scattering with respect to incidence rays to the surface of the object 12. In the present invention, the surface of the object 12 is divided into a plurality of unit surface regions as described above, and the light scattering measuring device 20 measures first MTF data indicating light scattering for each unit surface region.

Secondly, the light scattering measuring device 20 measures, for each of the various types of inks 16 configuring the print layer 17, MTF data (hereinafter, also referred to as second MTF data) related to light scattering of the various types of inks 16. To describe specifically, for example, as described above, the print layer forming device 40 forms the plurality of sample patterns SP1 to SP5 by gradually changing a dot density (that is, by changing a concentration) for each ink 16 including three colors of YMC inks, a black (K) ink, and a white (W) ink (see FIG. 6). The light scattering measuring device 20 measures light scattering with each of the sample patterns SP1 to SP5 as a target. Accordingly, the light scattering measuring device 20 measures second MTF data for each type of ink 16 for each density by changing a dot density.

Thirdly, the light scattering measuring device 20 measures light scattering with the surface of the medium 14 for texture reproduction, specifically, each of a plurality of types of internal scattering members 14b configuring the medium 14 as a target. Accordingly, the light scattering measuring device 20 measures MTF data (hereinafter, also referred to as third MTF data) related to the light scattering of the various types of internal scattering members 14b. Herein, in a case where parameters that change according to an internal scattering performance (light scattering) are different from each other, MTF data is different between the internal scattering members 14b different from each other. For example, in a case where Haze values are different from each other, as the type of the internal scattering member 14b to be used is changed and a Haze value changes, MTF data representing light scattering of the texture reproduced print 18 can be changed.

Computer

The computer 30 can be said as a printing control device that causes the print layer forming device 40 to form the print layer 17 based on MTF data (specifically, the MTF data representing color signal information and internal scattering information described above) related to the optical texture of the object 12. In the present invention, the computer 30 is composed of, for example, a host computer connected to the print layer forming device 40.

On the computer 30, a processor such as a central processing unit (CPU) and a memory such as a read only memory (ROM) and a random access memory (RAM) are mounted. In the memory, for example, an LUT for converting texture characteristic information of the object 12 into print data for producing the texture reproduced print 18, a texture reproducing application program for executing the conversion processing method for optical texture reproduction of the embodiment of the present invention using the LUT, and a program such as a printer driver are stored. The computer 30 creates texture reproducing print data for reproducing the optical texture of the surface of the object 12 as the processor executes the texture reproducing application program for executing the method of the embodiment of the present invention using the LUT and the printer driver.

In the present invention, in a case of performing LUT conversion in order to improve the accuracy of color reproduction in reproducing optical texture, color signal information and internal scattering information which are included in texture characteristic information of the object 12 are separately divided into values of the MTF (MTF data) of a color signal and are used as input values. Alternatively, a signal value of the perceptual uniform color space obtained by changing the MTF data of the imaged color signal, which is the color signal information and the internal scattering information included in the texture characteristic information of the object 12, is used as an input value.

That is, in the first embodiment of the present invention, texture characteristic information of the object 12 is separated into color signal information and internal scattering information, MTF data is acquired as the color signal information and the internal scattering information, and the MTF data acquired as the color signal information and the internal scattering information is an input for LUT conversion processing using an LUT. For example, in a case where MTF data of RGB channels is acquired as texture characteristic information, MTF data of the RGB channels at zero frequency is separated as color signal information, and MTF data of the RGB channels at other than zero frequency is separated as internal scattering information. Then, a ratio of MTF data of color signal information (RGB) (the MTF data of the RGB channels at zero frequency) to MTF data of internal scattering information (the MTF data of the RGB channels at other than zero frequency) is changed preferably by increasing the weight of the color signal information and more preferably by increasing the weight of the color signal information 2 times or more, and the changed ratio is used as an input for LUT conversion processing. By doing so, granular feeling, roughness, grayscale inversion, and/or tone jump can be suppressed in reproducing optical texture, and the accuracy of color reproduction can be improved.

On one hand, in the second embodiment of the present invention, MTF data of the RGB channels of the imaged object 12 is acquired with texture characteristic information of the object 12 as color signal information and internal scattering information, the MTF data of the RGB channels is converted or changed into a signal value of the perceptual uniform color space, and the signal value of the uniform color space is used as an input for LUT conversion processing using an LUT. For example, in a case where the MTF data of the RGB channels is acquired as texture characteristic information, MTF data of the RGB channels at zero frequency is acquired as color signal information, and MTF data of the RGB channels at other than zero frequency is acquired as internal scattering information. Then, MTF data at all frequencies existing in the RGB channels is converted into MTF data that is a signal value of the L*a*b* color space which is the perceptual uniform color space. Since color signal information is accurately converted in conversion from the RGB channels into the perceptual uniform color space such as the L*a*b* color space, granular feeling, roughness, grayscale inversion, and/or tone jump can be suppressed in reproducing optical texture, and the accuracy of color reproduction can be improved.

On the other hand, texture reproducing print data for producing the texture reproduced print 18 obtained through LUT conversion processing is the amounts (CMYKW) of various types of inks 16 and scattering (S) required for the medium 14. That is, the amount C of a cyan (C) ink, the amount M of a magenta (M) ink, the amount Y of a yellow (Y) ink, the amount K of a black (K) ink, the amount W of a white (W) ink, and a scattering amount of a scattering layer S of the medium 14 can be given as examples of the texture reproducing print data.

As described above, the texture reproducing print data is data indicating forming conditions of the print layer 17. Herein, the forming conditions of the print layer 17 is a combination of parameters that include a layer structure including the presence or absence of the color layer 17a, the thickness of each ink layer, a dot density (concentration) in each ink layer, the type of scattering of the internal scattering member 14b included in the medium 14 for texture reproduction. A plurality of forming conditions can be determined by changing each of the parameters described above, and from the forming conditions, forming conditions that are actually adopted in a case of forming a print layer are selected according to the texture of a reproduction target.

The forming conditions of the print layer 17 may be any conditions related to at least one of the parameters, and a condition related to a parameter other than the parameters may be included.

In addition, in the present invention, a print layer formed range on the print surface of the medium 14 is divided into a plurality of unit regions, and forming conditions that are actually adopted in a case of forming the print layer 17 are set for each unit region.

The computer 30 creates print data indicating forming conditions set for each unit region and transmits the print data toward the print layer forming device 40. In the print layer forming device 40, the control mechanism 42 receives the print data and controls each unit of the print layer forming device 40 in accordance with the print data. Accordingly, the print layer forming device 40 forms the print layer 17 on the print surface of the medium 14. In this case, the print layer forming device 40 forms each portion of the print layer 17 in accordance with forming conditions set with respect to a unit region corresponding to each portion. Accordingly, each portion of the print layer 17 is formed in an image-wise manner according to the position of each portion.

Next, the conversion processing method using a texture reproduction conversion LUT will be described.

FIG. 9 is a diagram showing an example of a flow of LUT conversion processing using the texture reproduction conversion LUT used in the present invention.

In the conversion processing using the texture reproduction conversion LUT shown in FIG. 9, texture information (light scattering information for each unit region, that is, each pixel position) is converted into ink amount information via the LUT.

First, as shown in FIG. 9, in texture characteristic information (internal scattering information and color signal information) acquisition processing S10, for example, the light scattering measuring device 20 measures, for each unit region of the object 12, which is a texture reproduction sample, texture characteristic information, herein, multi-dimensional, that is, 18-dimensional MTF data (first MTF data) at a plurality of frequencies, in the example shown in FIG. 9, six frequencies (including zero frequency representing color signal information in the present invention) for each color channel of the three RGB channels.

Next, as shown in FIG. 9, in multi-dimensional information conversion processing S12, a conversion LUT corresponding to internal scattering, in which MTF data (internal scattering information) of the three RGB channels acquired by separating out MTF data at zero frequency from the 18-dimensional MTF data through simulation calculation is used as an input value and a combined condition group of each ink, which consists of ink amount data of the CMYKW inks 16 and scattering amount data of the scattering layer (internal scattering member 14b) S of the medium 14, is used as an output value, is used.

In this manner, in the multi-dimensional information conversion processing S12, the MTF data of the three RGB channels is converted into ink amount data of the CMYKW inks 16 and scattering amount data of the scattering layer S of the medium 14, which are forming conditions of the texture reproduced print 18, using such a conversion LUT.

In this manner, as shown in FIG. 9, in ink pattern information acquisition processing S14, print data (the forming conditions of the texture reproduced print 18) that consists of the ink amount data of the CMYKW inks 16 and the scattering amount data of the scattering layer (internal scattering member 14b) S of the medium 14 is acquired.

In the present invention, RGBMTF data at zero frequency that represents color signal information, and RGBMTF data that represents the other information, which is internal scattering information, are separated.

Therefore, also the MTF data of the RGB channels at zero frequency that represents color signal information is converted into the forming conditions of the texture reproduced print 18, which include the ink amount data of each color and the scattering amount data of the medium 14, using the conversion LUT, simultaneously for color reproduction with improved accuracy.

As described above, in the present invention, the color signal information (MTF data of the three RGB channels at zero frequency) and the internal scattering information (MTF data of the three RGB channels at frequencies other than zero) are separately treated. In this case, a ratio between the color signal information and the internal scattering information changes in the present invention, but in order to improve the accuracy of color reproduction, the weight of the color signal information is preferably increased, and more preferably increased two times or more. Alternatively, in LUT conversion, in calculating an error amount in LUT conversion processing given by a distance from a lattice point of the LUT, it is preferable to make the weight of an error amount of the color signal information and the weight of an error amount of the internal scattering information different from each other, and it is more preferable to make the weight of the error amount of the color signal information smaller than the weight of the error amount of the internal scattering information.

Herein, as input values of the conversion LUT, MTF data, which is the color signal information, and MTF data, which is the internal scattering information, are preferably weighted data multiplied by the weight of each ratio. In this case, weighted addition MTF data obtained by weighting and adding both of weighted data pieces in a predetermined ratio may be converted through the conversion LUT, and the ink amount data of each of the CMYKW inks 16 and the scattering amount data of the scattering layer S of the medium 14 may be acquired to be used as print data for reproducing the object 12. In addition, each piece of weighted data of the color signal information and the internal scattering information may be converted through the conversion LUT, the ink amount data of each of the CMYKW inks 16 and the scattering amount data of the scattering layer S of the medium 14 may be acquired, and each of the acquired ink amount data of each color and the scattering amount data may be added to obtain print data for reproducing the object 12.

Instead of acquiring each piece of weighted data of the MTF data, which is the color signal information, and the MTF data, which is the internal scattering information, in advance, each piece of MTF data may be converted into each piece of the ink amount data and the scattering amount data of the medium 14, and the ink amount data and the scattering amount data of the medium 14 after conversion may be weighted in a predetermined ratio and then each may be added to obtain print data for reproducing the object 12.

As such a conversion LUT, a conversion LUT stored in the computer 30 in advance may be used or a conversion LUT may be newly created each time using the computer 30.

For example, the conversion LUT can be created as follows.

FIG. 10 is a flowchart showing an example of conversion LUT creation processing of creating a texture reproduction conversion LUT used in the present invention.

As shown in FIG. 10, a conversion LUT creating method consists of sample pattern print processing S20, MTF data measurement processing S22, light scattering estimation processing S24, and LUT creation processing S26. The conversion LUT creating method can be executed using the print system 10 shown in FIG. 1. Hereinafter, each type of processing will be individually described.

Sample Pattern Print Processing

First, the sample pattern print processing S20 is processing in which the print layer forming device 40 forms the sample patterns SP1 to SP5 described above on the print surface of the medium 14. To describe more specifically, the computer 30 transmits sample pattern forming print data to the print layer forming device 40, and the control mechanism 42 of the print layer forming device 40 receives the print data. The sample pattern forming print data is created in advance and is stored in the memory in the computer 30.

The control mechanism 42 controls the moving mechanism 44 and the ink discharging mechanism 46 in accordance with the sample pattern forming print data and also controls the hardening mechanism in a case where the hardening mechanism is further included. Accordingly, on the print surface of the medium 14, the sample patterns SP1 to SP5 are printed with a dot density (concentration) gradually changed for each of five colors of inks including YMCK and W (see FIG. 6). Each of the sample patterns SP1 to SP5 is composed of a plurality of pattern pieces having dot densities (concentrations) different from each other. Herein, although it is possible to freely set the number of pattern pieces configuring each of the sample patterns SP1 to SP5 and a dot density (concentration) in each pattern piece, in the example shown in FIG. 6, the number of pattern pieces is four, and a concentration in each pattern piece is 25%, 50%, 75%, and 100%.

MTF Data Measurement Processing

The MTF data measurement processing S22 is processing in which the light scattering measuring device 20 measures the second MTF data and the third MTF data which are described above. To describe more specifically, first, the light scattering measuring device 20 measures MTF data with each of the sample patterns SP1 to SP5 printed on the medium 14 in the sample pattern print processing described above as a target. In this case, the light scattering measuring device 20 measures light scattering (MTF) of each of a plurality of pattern pieces configuring each of the sample patterns SP1 to SP5. That is, the light scattering measuring device 20 measures light scattering (MTF) for each dot density by changing a dot density (concentration) thereof for each of the sample patterns SP1 to SP5. Accordingly, the light scattering measuring device 20 measures, for each ink type, second MTF data indicating light scattering for each dot density (concentration).

Next, the light scattering measuring device 20 measures light scattering (MTF) of the internal scattering member 14b included in the medium 14 for texture reproduction. In this case, in a case where a plurality of types of internal scattering members 14b are prepared, the light scattering measuring device 20 measures scattering amount data (MTF) of a scattering layer for each of the various types of internal scattering members 14b. Accordingly, the light scattering measuring device 20 measures, for each type of internal scattering members 14b, third MTF data indicating light scattering of the internal scattering member 14b.

Then, the light scattering measuring device 20 transmits the measured second MTF data and the measured third MTF data toward the computer 30.

Light Scattering Estimation Processing

The light scattering estimation processing S24 is processing in which the computer 30 estimates light scattering of the texture reproduced print 18 according to forming conditions of the print layer 17 based on second MTF data and third MTF data for each ink type. Herein, the "light scattering of the texture reproduced print 18 according to forming conditions of the print layer 17" is light scattering of the texture reproduced print 18 which is generated in a case where the print layer 17 is tentatively formed under certain forming conditions.

In addition, herein, as described above, forming conditions of the print layer 17 is set for each unit region, and in accordance with the forming conditions, the light scattering of the texture reproduced print 18 is estimated for each unit region also in the light scattering estimation processing S24.

To describe the light scattering estimation processing S24 specifically, a plurality of forming conditions of the print layer 17 are prepared at the start of the present processing S24. Specifically, a plurality of combinations are prepared related to a lamination number of ink layers in the print layer 17, the type of ink configuring each ink layer, the thickness of each ink layer, a dot density (concentration) in each ink layer, and the type of the internal scattering member 14*b* used in the medium 14 for texture reproduction.

After then, the computer 30 executes the light scattering estimation processing S24 in accordance with the flow shown in FIG. 11.

FIG. 11 is a flowchart showing an example of a flow of the light scattering estimation processing shown in FIG. 10. To describe the flow of the light scattering estimation processing S24 with reference to FIG. 11, the computer 30 first sets a plurality of combinations related to the forming conditions of the print layer 17 in Step S30. In Step S30, contents of the forming conditions described above, specifically, a lamination number of ink layers configuring the print layer 17, the type of ink configuring each ink layer, the thickness of each ink layer, a dot density in each ink layer, and each of types of internal scattering members 14*b* are defined as parameters, and each possible combination of parameters is identified.

Next, in Step S32, the computer 30 estimates, for each of the plurality of combinations related to the forming conditions set in Step S30, light scattering reproduced under the forming conditions related to the combination.

In the present invention, since light scattering is represented by the MTF, in order to estimate an MTF characteristic, which is light scattering, light scattering analysis calculation is performed using the combination of the conditions set in Step S30, second MTF data for each ink type measured for each dot density, and third MTF data measured for each type of internal scattering member 14*b*.

In the light scattering analysis calculation, the content of the conditions identified for each unit region in Step S30, the second MTF data for each ink type, which is measured for each dot density, and the third MTF data measured for each type of internal scattering member 14*b* are applied. As a result, light scattering (specifically, an MTF characteristic) of each unit region is calculated. Herein, the MTF characteristic, which is the calculation result, is an estimation result of light scattering related to each portion of the texture reproduced print 18, which is a final product.

A specific example of the light scattering analysis calculation described above includes calculation described in "Kubelka P (1954) New contributions to the optics of intensely light-scattering materials. Part II: Nonhomogeneous layers. J Opt Soc Am 44(4):330-335."

Next, in Step S34, it is determined whether estimation of light scattering is performed for all of the plurality of combinations set related to the forming conditions. In a case where the estimation is not performed, processing returns to Step S30, and in a case where the estimation is performed, the light scattering estimation processing S24 is terminated. In this manner, in the light scattering estimation processing S24, the series of steps, that is, Steps S30 and S32 of FIG. 11 are repeated for all of the plurality of combinations set related to the forming conditions. Accordingly, the light scattering of the texture reproduced print 18 generated in a case where the print layer 17 is formed under the forming conditions related to each combination is estimated by changing combinations.

LUT Creation Processing

The LUT creation processing is processing of creating an LUT indicating a correspondence relationship between the plurality of combinations set related to the forming conditions and the estimation result of light scattering reproduced under the conditions related to the combination.

In a case where the estimation of light scattering is performed for all of the plurality of combinations set related to the forming conditions in the previous light scattering estimation processing S24, the combination related to the forming conditions and the estimation result of light scattering reproduced under the conditions related to the combination are associated with each other, and the correspondence relationship is created by being made into data as a conversion LUT.

In this manner, the conversion LUT used in the present invention can be created.

The created conversion LUT is referred in the conversion processing method for texture reproduction of the embodiment of the present invention to be executed later.

Processing Flow of Texture Reproduced Print Production Including Processing Flow of Embodiment of Present Invention Next, a processing flow of the printed material production method of producing the texture reproduced print 18 in which the optical texture of the object 12 is reproduced, that is, a processing flow of texture reproduced print production including a processing flow of the conversion processing method for optical texture reproduction of the embodiment of the present invention will be described.

FIG. 12 shows an example of the processing flow of the texture reproduced print production in which the conversion processing method of the first embodiment of the present invention is executed.

As shown in FIG. 12, the processing flow of the texture reproduced print production is composed of MTF data measurement processing S40, MTF data separation processing S42, LUT conversion processing S44, and print output processing S46. Hereinafter, each type of processing will be individually described.

MTF Data Measurement Processing

The MTF data measurement processing S40 is processing of measuring MTF data representing texture characteristic information of the object of which texture is to be reproduced 12.

In the MTF data measurement processing S40, for example, a color patch 50 and a texture reproduction sample 52 are prepared as the object of which texture is to be reproduced 12. Herein, the color patch 50 consists of, for example, four patches having different concentrations for each of RGB colors and a neutral color (NC). The texture reproduction sample 52 is, for example, a marble sample having light scattering.

Herein, for example, the light scattering measuring device 20 of the print system 10 divides the surface of the color patch 50, which is the object 12, into a plurality of unit surface regions (one patch), and the light scattering measuring device 20 measures MTF data of the RGB channels representing light scattering (internal scattering characteristic) of the color patch 50 with respect to incidence rays to the surface of the color patch 50 for each unit surface region (each patch). In addition, MTF data for each unit surface region of the texture reproduction sample 52, which is the object 12, may also be simultaneously measured. Accordingly, the light scattering measuring device 20 measures first MTF data for each unit surface region of the object 12 such as the color patch 50 and the texture reproduction sample 52.

In FIG. 12, MTF of the three RGB channels measured at six frequencies for each patch is represented as six color patches 54, and the MTF of the three RGB channels of one patch is represented as a graph 54a and a graph 54b. In the graphs, there is a curve connecting points indicating intensities at six frequencies including zero for each of RGB, and the points consist of 18-dimensional MTF data as a whole.

MTF Data Separation Processing

The MTF data separation processing S42 is processing in which the computer 30 separates out MTF data of internal scattering information and MTF data of color signal information which are included in MTF data of texture characteristic information for each unit surface region of the object 12.

MTF data of RGB at zero frequency, which represents the color signal information, and MTF data at five frequencies other than zero, which represents only the internal scattering information, are separated out from 18-dimensional MTF data of the three RGB channels at six frequencies.

In FIG. 12, a color patch 56 that includes each of colors of color patches 56R, 56G, and 56B, which represents MTF data of each of RGB at zero frequency representing color signal information, and represents MTF data, and five color patches 58 that represent MTF data at five frequencies, which are frequencies other than zero and represent only the internal scattering information, are separately shown.

LUT Conversion Processing

The LUT conversion processing S44 is executed by the computer 30. In the LUT conversion processing S44, first, MTF data of RGB of color signal information and MTF data of only internal scattering information, which are separated from each other, are weighted in a predetermined ratio for each unit surface region. Next, the MTF data of RGB of the color signal information and the MTF data of only the internal scattering information, which are respectively weighted, are respectively LUT-converted, and each of the amounts CMYKW of inks 16 and the scattering amount of the scattering layer S of the medium 14 are acquired and finally added for each color and each scattering amount so that print data is obtained.

In FIG. 12, the ink amount data of five types of CMYKW inks 16 after conversion and the scattering amount of the scattering layer (internal scattering member 14b) S of the medium 14 are shown by six color patches 60.

Herein, since it cannot be said that MTF data, which is measured for each unit surface region, is separated, and becomes an input value of the LUT, matches MTF data of the RGB channels of the LUT, closest (an error is smallest) MTF data of an LUT is set as MTF data to become an input value of the LUT.

In the LUT, print data corresponding to the set MTF data of the LUT, that is, the ink amount data of the five types of CMYKW inks 16, and the scattering amount of the scattering layer (internal scattering member 14b) S of the medium 14 are acquired. In this manner, an input value of the MTF data is converted into an output value of print data.

As described above, in such LUT conversion, in calculating an error amount in the LUT conversion processing given by a distance from a lattice point of the LUT, it is preferable to make the weight of an error amount of the MTF data of the color signal information and the weight of an error amount of the MTF data of the internal scattering information different from each other, and it is more preferable to make the weight of the error amount of the color signal information smaller than the weight of the error amount of the internal scattering information.

Alternatively, in the LUT conversion, as described above, it is preferable to make the weight of the color signal information larger in a ratio between the color signal information and the internal scattering information.

In this manner, in a case of LUT-converting the color signal information, which is color information configuring the texture characteristic information of the object 12 (the color patch 50 and the texture reproduction sample 52), and internal scattering information, the color signal information and the internal scattering information, which are measured for each unit surface region, are separated out, LUT conversion is performed by changing the weights of both of the error amounts to preferably make the weight of the error amount of the color signal information smaller or by changing both of the weights to preferably make the weight of the color signal information larger, and accordingly, print data (ink amount data of the five types of CMYKW inks 16 and the scattering amount of the scattering layer (internal scattering member 14b) S of the medium 14) suitable for reproducing the texture of the object 12 is acquired for each unit surface region.

Print Output Processing

The print output processing S46 is processing of outputting a color patch print 62, in which the texture of the color patch 50 is reproduced, and a texture reproduced print 64, in which the texture of the texture reproduction sample 52 is reproduced, based on the print data obtained in the LUT conversion processing S44.

In the print output processing S46, first, the computer 30 transmits the print data set for each unit region toward the print layer forming device 40.

Next, the print layer forming device 40 forms (prints) the multilayer structure print layer 17 on the medium 14 for texture reproduction in accordance with the print data. Herein, the print data is created based on the MTF data (specifically, the MTF data of the color signal information and the internal scattering information) related to the texture characteristic information of the object 12 as the computer 30 performs the LUT conversion processing. Therefore, the print output processing S46 is processing of forming the print layer 17 on the medium 14 for texture reproduction based on the print data which is LUT-converted from the MTF data related to the texture characteristic information of the object 12.

In this manner, in texture reproduced print production processing, in which the conversion processing method of the first embodiment of the present invention is executed, the texture reproduced print 18, such as the color patch print 62 and the texture reproduced print 64, in which the texture of the object 12 such as the color patch 50 and the texture reproduction sample 52 is reproduced with high accuracy, particularly there is no graininess (roughness) and tone jump generated in reproduction of texture of the related art, and color reproduction and light scattering are reproduced with high accuracy, can be output.

FIG. 13 shows an example of the processing flow of the texture reproduced print production in which the conversion processing method of the second embodiment of the present invention is executed.

As shown in FIG. 13, the processing flow of the texture reproduced print production is composed of the MTF data measurement processing S40, Lab conversion processing S48, LUT conversion processing S50, and the print output processing S46. Hereinafter, each type of processing will be individually described. However, since the MTF data measurement processing S40 and the print output processing S46 are the same as the steps in the processing flow of the texture reproduced print production shown in FIG. 12, detailed description thereof will be omitted.

MTF Data Measurement Processing

As described above, the MTF data measurement processing S40 is processing of measuring, for each unit surface region, the MTF data representing the texture characteristic information of the object of which texture is to be reproduced 12.

In the MTF data measurement processing S40, as described above, for example, the MTFs of the color patch 50 and the texture reproduction sample 52 are measured as the object of which texture is to be reproduced 12, and are obtained as the six color patches 54 which are MTFs measured at six frequencies for each of the three RGB channels for each patch.

Lab Conversion Processing

The Lab conversion processing S48 is processing in which the computer 30 converts a value of MTF data of the three RGB channels of the internal scattering information and the color signal information that are included in the texture characteristic information of the object 12, which is obtained by imaging the object 12, into a signal value of the perceptual uniform color space, that is, the L*a*b* color space.

In the Lab conversion processing S48, conversion from 18-dimensional MTF data of the three RGB channels at six frequencies into six types of MTF data of L*, which represents lightness, and six types of MTF data of each of chromaticity a*, and chromaticity b*, which indicate color tone and chroma saturation respectively, is performed.

In FIG. 13, the six types of MTF data of L* are represented by six color patches 66L, the six types of MTF data of chromaticity a* are represented by six color patches 66a, and the six types of MTF data of chromaticity b* are represented by six color patches 66b.

The six types of MTF data of each of L*, chromaticity a*, and chromaticity b* correspond to six frequencies respectively, and MTF data at zero frequency, which represents the color signal information, and five frequencies, which are frequencies other than zero and represent only the internal scattering information, are included therein.

In the Lab conversion processing S48, since a value of MTF data of the three RGB channels is converted into a signal value of the perceptual uniform color space (for example, the L*a*b* color space), color reproduction is reliably performed, and reproduction of light scattering (internal scattering information) is unlikely to be affected also in the subsequent LUT conversion processing S50. Thus, color reproduction and light scattering are reproduced in the texture reproduced print 18 with high accuracy.

LUT Conversion Processing

The LUT conversion processing S50 is executed by the computer 30 like the LUT conversion processing S44 shown in FIG. 13. In the LUT conversion processing S50, first, three types of MTF data, including the MTF data of L*, the MTF data of a*, and the MTF data of b*, which include the color signal information and the internal scattering information, are LUT-converted for each unit surface region, and print data that consists of the amounts CMYKW of inks 16 and the scattering amount of the medium 14 is obtained.

Also in FIG. 13, as in the case of FIG. 12, the ink amount data of the five types of CMYKW inks 16 after conversion and the scattering amount of the scattering layer (internal scattering member 14b) S of the medium 14 are shown by the six color patches 60.

Herein, since it cannot be said that MTF data, which is measured for each unit surface region, is separated, and becomes an input value of the LUT, matches the three types of MTF data of the L*a*b* color space of the LUT, closest (an error is smallest) MTF data of the LUT is set as the MTF data to become the input value of the LUT.

In the LUT, print data corresponding to the set MTF data of the LUT, that is, the ink amount data of the five types of CMYKW inks 16, and the scattering amount of the scattering layer (internal scattering member 14b) S of the medium 14 are acquired. In this manner, an input value of the MTF data is converted into an output value of print data.

In this manner, by LUT-converting the three types of MTF data of the L*a*b* color space including the color signal information and the internal scattering information, which configure the texture characteristic information of the object 12 (the color patch 50 and the texture reproduction sample 52), print data (ink amount data of the five types of CMYKW inks 16 and the scattering amount of the scattering layer (internal scattering member 14b) S of the medium 14) suitable for reproducing the texture of the object 12 is acquired for each unit surface region.

Print Output Processing

The print output processing S46 is processing of outputting the color patch print 62, in which the texture of the color patch 50 is reproduced, and the texture reproduced print 64, in which the texture of the texture reproduction sample 52 is reproduced, based on the print data obtained in the LUT conversion processing S50.

The print output processing S46 shown in FIG. 13 is different from the print output processing S46 shown in FIG. 12 in that print data is obtained in the LUT conversion processing S50, but is the same in that print data becomes an input, thereby being performed in the same manner.

In this manner, even in a case where the conversion processing method of the second embodiment of the present invention is executed, as in the case of the first embodiment, the texture reproduced print 18, such as the color patch print 62 and the texture reproduced print 64, in which the texture of the object 12 such as the color patch 50 and the texture reproduction sample 52 is reproduced with high accuracy, particularly there is no graininess (roughness) and tone jump generated in reproduction of texture of the related art, and color reproduction and light scattering are reproduced with high accuracy, can be output.

Next, in the present invention, reasons why problems such as graininess, particularly granular feeling (roughness), grayscale inversion, and/or tone jump generated in reproduction printing of the related art are solved, reproduction of color reproduction, which is an important element of texture, is good, and color reproduction and light scattering can be reproduced with high accuracy will be described.

Figure 14:
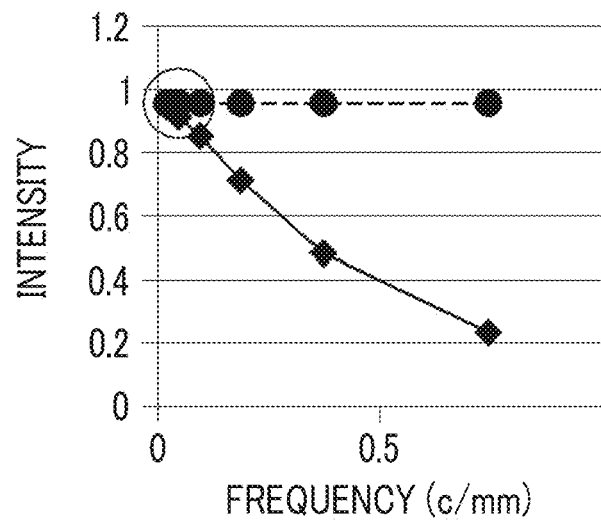
FIG. 14 is an example of a graph of an MTF showing an LUT using method in the conversion processing method for optical texture reproduction of the embodiment of the present invention.

FIG. 14 shows an example of a graph of the MTF indicating an LUT using method for optical texture reproduction of the embodiment of the present invention. On the other hand, FIG. 15 shows an example of a graph of the MTF indicating an LUT using method of the related art for optical texture reproduction.

Figure 15:
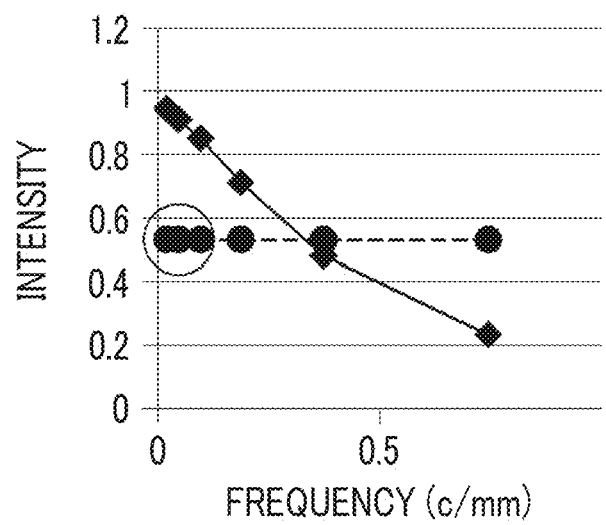
FIG. 15 is a graph of an MTF showing an LUT using method of the related art for optical texture reproduction.

In the graph of the MTF shown in FIG. 15 of the related art, with respect to a graph of a target MTF, which is close to the intensity of 1 at zero frequency indicating an average color, decreases as going toward high frequencies, and is indicated by a solid line, an approximate MTF by an ink, which is substantially constant at the intensity of approximately 0.5 from zero frequency to a high frequency and is indicated by a dotted line, is selected as an MTF in reproduction printing.

However, in the graph of the MTF, an error of intensity at zero frequency representing an average ink color is large as 0.5, the error with respect to the ink average color is large, and a color difference is remarkably visible as described above.

On the contrary, in the present invention, with respect to the graph of the target MTF, which is indicated by the solid line, the approximate MTF by an ink, which is close to the intensity of 1 in the period 0 from period 0 to a high frequency, which indicates the average color, is substantially constant, and is indicated by the dotted line, is selected as the graph of the MTF in reproduction printing.

As a result, an error with respect to the ink average color in the reproduction printing is small, and a visible color difference is reduced. On the other hand, on a frequency space, that is, on the graph, an error of a high frequency portion indicating the spread of light seems to be large. However, since the MTF of the ink has not changed as a ratio to zero frequency, in the real space, a difference visible to the human eye, which is a light scattering deviation amount, that is, a difference in a light spread distance is approximately the same.

Therefore, in the present invention, reproduction of color reproduction, which is an important element of texture, is good, and color reproduction and light scattering can be reproduced with high accuracy.

Herein, the MTF used in the present invention will be supplementally described.

Figure 16:
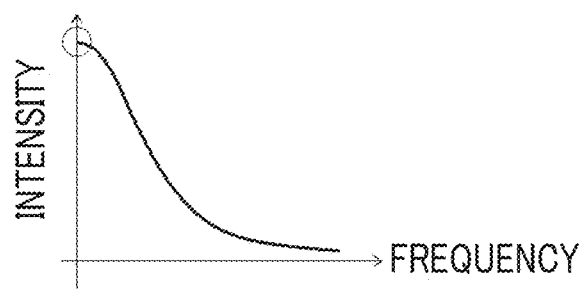
FIG. 16 is an example of a graph showing an MTF.

First, as shown in FIG. 16, the MTF shows the spread of a point image of light incident to one point of an object in a frequency space, and is written as intensity (amplitude), such as a brightness value and reflectivity with respect to a frequency. Similarly, the MTF is an absolute value of the point spread function (PSF), which shows the spread of the point image of the light incident to the one point of the object in the real space and is expressed in a frequency region.

In the graph of the MTF shown in FIG. 16, a portion surrounded by a circle, in which the frequency is 0, represents an average value. Therefore, the portion where the frequency is 0 represents an average color of RGB in a case of the MTF of colors such as RGB. In addition, in a case of the MTF of the L*a*b* color space, the portion where the frequency is 0 represents average lightness in a case of L*, and indicates average color tone and average chroma saturation in a case of a*b*.

As shown in (A) and (B) of FIG. 17, in two different graphs of MTFs, which are indicated by a dotted line and a solid line in the frequency space shown in (A) of FIG. 17, the dotted line is on an outer side, but in two different graphs of PSF, which are indicated by a dotted line and a solid line in the real space shown in (B) of FIG. 17, the solid line is on the outer side. A relationship with the spread in both graphs is reverse. That is, it can be said that a relationship of half-width (spread) is reversed between the frequency space and the real space.

Therefore, as shown in FIG. 18, since half-widths of two different graphs of the MTFs, in which the intensity is maximum at a portion where the frequency is 0 and the intensity decreases toward a high frequency, almost match each other, it can be said that a degree (distance) of light scattering is almost the same in the real space as can be seen from (A) and (B) of FIG. 17.

In addition, as shown in FIG. 19, in two different graphs of the MTFs, in which maximum intensities are different from each other at a portion where the frequency is 0 but the intensities similarly decrease toward a high frequency, since half-widths themselves almost match each other while intensities at which the half-widths are taken are different from each other, it can be said that a degree (distance) of light scattering is almost the same in the real space as can be seen from (A) and (B) of FIG. 17.

From the above, it can be seen that color reproduction can be improved without deteriorating light scattering in the real space by giving the color signal information (MTF data) priority over the internal scattering information (MTF data) in the frequency space (MTF data), in a case of LUT-converting the internal scattering information and the color signal information, which are included in the texture characteristic information of the object, in the present invention.

Although various embodiments and examples of the conversion processing method for optical texture reproduction according to the embodiments of the present invention have been described in detail hereinbefore, the present invention is not limited to the embodiments and the examples, and it is evident that various improvements or changes may be made without departing from the gist of the present invention.

EXPLANATION OF REFERENCES

1*a*, 1*b*, 1*c*: part
10: print system
12: object of which texture is to be reproduced (object)
14: medium
14*a*: white medium
14*b*: internal scattering member
16: ink
17: print layer
17*a*: color layer
17*b*: white layer
18, 64: texture reproduced print
20: light scattering measuring device
30: computer 40: print layer forming device
42: control mechanism
44: moving mechanism
44a: drive roller
44R: moving path
46: ink discharging mechanism
46S: nozzle surface
50, 54, 56, 56R, 56G, 56B, 58, 60, 66L, 66a, 66b, 70: color patch
52: texture reproduction sample
54a, 54b: graph of MTF
62, 72: color patch print
72a: region
74: reproduced image print
LP: rectangular wave chart
LPx: rectangular pattern
Nc, Nm, Ny, Nk, Nw: nozzle row
SP1, SP2, SP3, SP4, SP5: sample pattern

What is claimed is:

1. A conversion processing method of performing lookup table conversion processing for converting, via a lookup table, texture characteristic information of an object of which texture is to be reproduced into ink amount information of an ink, which is used in order to reproduce the object of which texture is to be reproduced on a medium, the conversion processing method comprising:
separating the texture characteristic information into internal scattering information and color signal information; and
using the internal scattering information and the color signal information, which are separated out, as inputs of the lookup table conversion processing,
wherein the lookup table conversion processing is processing of using values of a modulation transfer function as the internal scattering information and the color signal information.

2. The conversion processing method according to claim 1,
wherein a value of the modulation transfer function is acquired as the texture characteristic information,
the value of the modulation transfer function acquired as the texture characteristic information is separated into a value of the modulation transfer function as the internal scattering information and a value of the modulation transfer function as the color signal information, and
the values of the modulation transfer function acquired as the internal scattering information and the color signal information are used as input values of the lookup table conversion processing.

3. The conversion processing method according to claim 2,
wherein the color signal information is color signal information in which human visual characteristics with respect to lightness, chroma saturation, and color tone are considered.

4. The conversion processing method according to claim 2,
wherein in calculation of an error amount in the lookup table conversion processing in which a distance from a lattice point of the lookup table is given, a weight of an error amount of the color signal information and a weight of an error amount of the internal scattering information are different from each other.

5. The conversion processing method according to claim 2,
wherein in a ratio between the color signal information and the internal scattering information, which is a weight of the modulation transfer function, a weight of the color signal information is large.

6. The conversion processing method according to claim 2,
wherein the internal scattering information is converted into amounts of cyan (C), magenta (M), yellow (Y), and black (K) inks and an amount of a white (W) ink and a scattering amount of a scattering layer included in the medium through the lookup table conversion processing.

7. The conversion processing method according to claim 1,
wherein the values of the modulation transfer function are acquired as the internal scattering information and the color signal information, which are separated out, and
the values of the modulation transfer function acquired as the internal scattering information and the color signal information are used as input values of the lookup table conversion processing.

8. The conversion processing method according to claim 1,
wherein the color signal information is color signal information in which human visual characteristics with respect to lightness, chroma saturation, and color tone are considered.

9. The conversion processing method according to claim 8,
wherein a signal value of an L*a*b* color space is used as the visual characteristic.

10. The conversion processing method according to claim 1,
wherein in calculation of an error amount in the lookup table conversion processing in which a distance from a lattice point of the lookup table is given, a weight of an error amount of the color signal information and a weight of an error amount of the internal scattering information are different from each other.

11. The conversion processing method according to claim 1,
wherein in a ratio between the color signal information and the internal scattering information, which is a weight of the modulation transfer function, a weight of the color signal information is large.

12. The conversion processing method according to claim 11,
wherein the weight of the color signal information is two times or more a weight of the internal scattering information.

13. A conversion processing method of performing lookup table conversion processing for converting, via a lookup table, texture characteristic information of an object of which texture is to be reproduced into ink amount information of an ink, which is used in order to reproduce the object of which texture is to be reproduced on a medium, the method comprising:
using, as an input value of the lookup table conversion processing, a signal value of a perceptual uniform color space changed from a value of a modulation transfer function that is internal scattering information and color signal information, which are included in the texture characteristic information, in an imaged RGB signal value.

14. The conversion processing method according to claim 13,
wherein the perceptual uniform color space is an L*a*b* color space.

15. The conversion processing method according to claim 1,
wherein the internal scattering information is converted into amounts of cyan (C), magenta (M), yellow (Y), and black (K) inks and an amount of a white (W) ink and a scattering amount of a scattering layer included in the medium through the lookup table conversion processing.

16. The conversion processing method according to claim 1,
wherein the texture characteristic information is red (R), green (G), and blue (B) signal values at a plurality of frequencies including zero frequency, the color signal information is red (R), green (G), and blue (B) signal values at zero frequency, and the internal scattering information is red (R), green (G), and blue (B) signal values at a plurality of frequencies excluding zero frequency.

17. A printed material production method of producing a printed material obtained by reproducing an object of which texture is to be reproduced on a medium from texture characteristic information of the object of which texture is to be reproduced, the printed material production method comprising:
separating the texture characteristic information into internal scattering information and color signal information;
using values of a modulation transfer function as the internal scattering information and the color signal information, which are separated out;
performing conversion into ink amount information of an ink for forming a print layer obtained by reproducing texture on the medium through lookup table conversion processing, in which a value of the modulation transfer function as the internal scattering information and a value of the modulation transfer function as the color signal information are used as inputs; and
producing the printed material by discharging the ink on the medium and forming the print layer based on the ink amount information.

18. A printed material production method of producing a printed material obtained by reproducing an object of which texture is to be reproduced on a medium from texture characteristic information of the object of which texture is to be reproduced, the printed material production method comprising:
changing a value of a modulation transfer function that is internal scattering information and color signal information, which are included in the texture characteristic information, in an imaged RGB signal value into a signal value of a perceptual uniform color space;
performing conversion into ink amount information of an ink for forming a print layer obtained by reproducing texture on the medium through lookup table conversion processing, using the signal value as an input value; and
producing the printed material by discharging the ink on the medium and forming the print layer based on the ink amount information.

19. A printed material production system that produces a printed material obtained by reproducing an object of which texture is to be reproduced on a medium from texture characteristic information of the object of which texture is to be reproduced, the printed material production system comprising:
a light scattering measuring device that acquires the texture characteristic information;
a computer that includes a lookup table, performs lookup table conversion processing using the lookup table, and converts the texture characteristic information into ink amount information of an ink; and
a print layer forming device that forms a print layer by discharging the ink on the medium based on the ink amount information to produce the printed material,
wherein the computer
separates the texture characteristic information acquired by the light scattering measuring device into internal scattering information and color signal information,
uses values of a modulation transfer function as the internal scattering information and the color signal information, which are separated out, and
performs conversion into the ink amount information of the ink for forming a print layer obtained by reproducing texture on the medium through the lookup table conversion processing, in which a value of the modulation transfer function as the internal scattering information and a value of the modulation transfer function as the color signal information are used as inputs.

20. A printed material production system that produces a printed material obtained by reproducing an object of which texture is to be reproduced on a medium from texture characteristic information of the object of which texture is to be reproduced, the printed material production system comprising:
a light scattering measuring device that acquires the texture characteristic information;
a computer that includes a lookup table, performs lookup table conversion processing using the lookup table, and converts the texture characteristic information into ink amount information of an ink; and
a print layer forming device that forms a print layer by discharging the ink on the medium based on the ink amount information to produce the printed material,
wherein the computer
changes values of a modulation transfer function that is internal scattering information and color signal information, which are included in the texture characteristic information acquired by the light scattering measuring device, in imaged red (R), green (G), and blue (B) signal values into a signal value of a perceptual uniform color space, and
performs conversion into the ink amount information of the ink for forming a print layer obtained by reproducing texture on the medium through the lookup table conversion processing, using the signal value as an input value.

* * * * *